US012532184B2

(12) United States Patent
Wang et al.

(10) Patent No.: US 12,532,184 B2
(45) Date of Patent: Jan. 20, 2026

(54) MULTI-ACCESS POINT COORDINATED SPATIAL REUSE PROTOCOL AND ALGORITHM

(71) Applicant: MediaTek Singapore Pte. Ltd., Singapore (SG)

(72) Inventors: James June-Ming Wang, San Jose, CA (US); Chung-Ta Ku, San Jose, CA (US); Gabor Bajko, San Jose, CA (US); Gary A. Anwyl, San Jose, CA (US); Shuling Feng, San Jose, CA (US); Jianhan Liu, San Jose, CA (US); Yongho Seok, San Jose, CA (US); Po-Yuen Cheng, San Jose, CA (US); James Chih-Shi Yee, San Jose, CA (US); Thomas Edward Pare, Jr., San Jose, CA (US)

(73) Assignee: MediaTek Singapore Pte. Ltd., Singapore (SG)

(*) Notice: Subject to any disclaimer, the term of this patent is extended or adjusted under 35 U.S.C. 154(b) by 134 days.

(21) Appl. No.: 18/138,047

(22) Filed: Apr. 22, 2023

(65) Prior Publication Data
US 2023/0269592 A1 Aug. 24, 2023

Related U.S. Application Data

(62) Division of application No. 17/066,103, filed on Oct. 8, 2020, now Pat. No. 11,671,837.
(Continued)

(51) Int. Cl.
H04W 16/02 (2009.01)
H04W 24/08 (2009.01)
(Continued)

(52) U.S. Cl.
CPC ........... H04W 16/02 (2013.01); H04W 24/08 (2013.01); H04W 48/20 (2013.01); H04W 52/04 (2013.01)

(58) Field of Classification Search
None
See application file for complete search history.

(56) References Cited

U.S. PATENT DOCUMENTS

2015/0078299 A1* 3/2015 Barriac ................. H04W 88/08
370/329
2015/0282043 A1* 10/2015 Fang .................... H04W 72/542
370/329
(Continued)

FOREIGN PATENT DOCUMENTS

CN 108702792 A 10/2018
CN 109076614 A 12/2018
(Continued)

OTHER PUBLICATIONS

"Consideration on Multi-AP Coordination", IEEE 802.11-19/1129r2, Sep. 2019, submitted in the IDS by the Applicant (Year: 2019).*
(Continued)

Primary Examiner — Jamaal Henson
(74) Attorney, Agent, or Firm — Andy M. Han; Han IP PLLC

(57) ABSTRACT

An apparatus implemented in a master access point (AP) selects at least one basic service set (BSS) from one or more neighbor BSSs to form a spatial reuse group (SRG). The apparatus then performs coordinated spatial reuse (CSR) in the SRG with a set of overlapping basic service set (OBSS) power detection (PD) parameters.

12 Claims, 28 Drawing Sheets

Related U.S. Application Data

(60) Provisional application No. 62/947,062, filed on Dec. 12, 2019, provisional application No. 62/916,354, filed on Oct. 17, 2019.

(51) Int. Cl.
*H04W 48/20* (2009.01)
*H04W 52/04* (2009.01)

(56) References Cited

U.S. PATENT DOCUMENTS

| | | |
|---|---|---|
| 2016/0050684 A1 | 2/2016 | Ni |
| 2017/0064644 A1 | 3/2017 | Cariou et al. |
| 2017/0070914 A1 | 3/2017 | Chun et al. |
| 2017/0070962 A1 | 3/2017 | Wang et al. |
| 2017/0255659 A1 | 9/2017 | Cariou et al. |
| 2018/0376467 A1* | 12/2018 | Patil .............. H04B 7/063 |
| 2019/0014580 A1 | 1/2019 | Cariou et al. |
| 2019/0124695 A1* | 4/2019 | Seok .............. H04W 8/005 |
| 2019/0208423 A1* | 7/2019 | Cherian .......... H04W 48/10 |
| 2020/0077273 A1* | 3/2020 | Cherian .......... H04W 48/20 |
| 2020/0305103 A1* | 9/2020 | Chen .............. H04W 56/001 |
| 2020/0374870 A1 | 11/2020 | Guo |
| 2021/0014695 A1* | 1/2021 | Minotani ........ H04W 16/14 |
| 2021/0022156 A1* | 1/2021 | Bhanage ......... H04W 72/535 |
| 2021/0084686 A1* | 3/2021 | Zhang ............. H04L 5/0094 |
| 2021/0360411 A1* | 11/2021 | Yan ................ H04L 5/00 |

FOREIGN PATENT DOCUMENTS

| | | | |
|---|---|---|---|
| CN | 109673028 A | 4/2019 | |
| CN | 110167145 A | 8/2019 | |
| EP | 3139671 A1 | 3/2017 | |
| WO | WO 2017121301 A1 | 7/2017 | |
| WO | WO-2019005078 A1 * | 1/2019 | .......... H04L 5/0073 |
| WO | WO 2019040059 A1 | 2/2019 | |

OTHER PUBLICATIONS

Taiwan Intellectual Property Office, Office Action for Taiwan Patent Application No. 109135900, Feb. 26, 2021.
European Patent Office, Extended European Search Report for European Patent Application No. 20201806.5, Feb. 1, 2021.
Huawei Technologies, AP Coordination in EHT, IEEE 802.11-19/0801r0, Mar. 11, 2019.
ZTE Corporation, Consideration on Multi-AP Coordination, IEEE 802.11-19/1129r2, Sep. 6, 2019.
Nokia, Coordinated Beamforming/Null Steering Protocol in 802.11be, IEEE 802.11-19/1594r2, Sep. 16, 2019.
China National Intellectual Property Administration, First Office Action in China Patent Application No. 202011117757.0, Jul. 21, 2023.
ZTE Corporation, "Consideration on Multi-AP Coordination", IEEE, pp. 5-6, Sep. 6, 2019.
China National Intellectual Property Administration, First Office Action in China Patent Application No. 202310726221.6, Oct. 1, 2025.

* cited by examiner

2700 —↘

SELECT AT LEAST ONE BASIC SERVICE SET (BSS) FROM ONE OR MORE NEIGHBOR BSSs TO FORM A SPATIAL REUSE GROUP (SRG)
2710

PERFORM COORDINATED SPATIAL REUSE (CSR) IN THE SRG WITH A SET OF OVERLAPPING BASIC SERVICE SET (OBSS) POWER DETECTION (PD) PARAMETERS
2720

MULTI-ACCESS POINT COORDINATED SPATIAL REUSE PROTOCOL AND ALGORITHM

CROSS REFERENCE TO RELATED PATENT APPLICATION

The present disclosure is part of a Divisional of U.S. patent application Ser. No. 17/066,103, filed 8 Oct. 2020 and claiming the priority benefit of U.S. Provisional Patent Application Nos. 62/916,354 and 62/947,062, filed 17 Oct. 2019 and 12 Dec. 2019, respectively. Contents of aforementioned applications are herein incorporated by reference in their entirety.

TECHNICAL FIELD

The present disclosure is generally related to wireless communications and, more particularly, to multi-access point (multi-AP) coordinated spatial reuse (CSR) protocol and algorithm.

BACKGROUND

Unless otherwise indicated herein, approaches described in this section are not prior art to the claims listed below and are not admitted as prior art by inclusion in this section.

Multi-AP coordination in wireless local area networks (WLANs) is one of the candidate features under the Institute of Electrical and Electronics Engineers (IEEE) 802.11be standard. Some multi-AP coordination schemes that have been discussed include joint transmission (JTX), coordinated beamforming (CBF), coordinate spatial reuse (CSR), and coordinated orthogonal frequency-division multiple access (OFDMA). It is believed that improved performance, such as higher throughput and improved interference control, via CSR under IEEE 802.11be can be achieved compared to the spatial reuse (SR) schemes specified in the IEEE 802.11ax standard. However, details on how multi-AP CSR can be implemented remain to be designed.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to multi-AP CSR in wireless communication networks such as WLANs. Specifically, various protocols and algorithms for multi-AP CSR are proposed in the present disclosure. As commercial Wi-Fi systems often have little control over the deployment environment, the present disclosure proposes a number of protocols for CSR that depend on measured interference levels from overlapping basic service set (OBSS) and AP coordination to achieve good spatial reuse gain with reduced interference.

In one aspect, a method may involve selecting at least one BSS from one or more neighbor BSSs to form a spatial reuse group (SRG). The method may also involve performing CSR in the SRG with a set of OBSS power detection (PD) parameters.

In another aspect, a method may involve an apparatus implemented in a master AP receiving a report on received power levels of one or more coordinated APs from each of one or more stations (STAs) associated with the master AP. The method may also involve the apparatus selecting at least one STA of the one or more STAs based on the report received from each of the one or more STAs. The method may further involve the apparatus selecting a coordinated AP from the one or more coordinated APs. The method may additionally involve the apparatus performing CSR transmissions in conjunction with the at least one coordinated AP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to multi-AP CSR protocols and algorithms in wireless communications. According to the present disclosure, a number of possible solutions may be implemented separately or jointly. That is, although these possible solutions may be described below separately, two or more of these possible solutions may be implemented in one combination or another.

Figure 1:
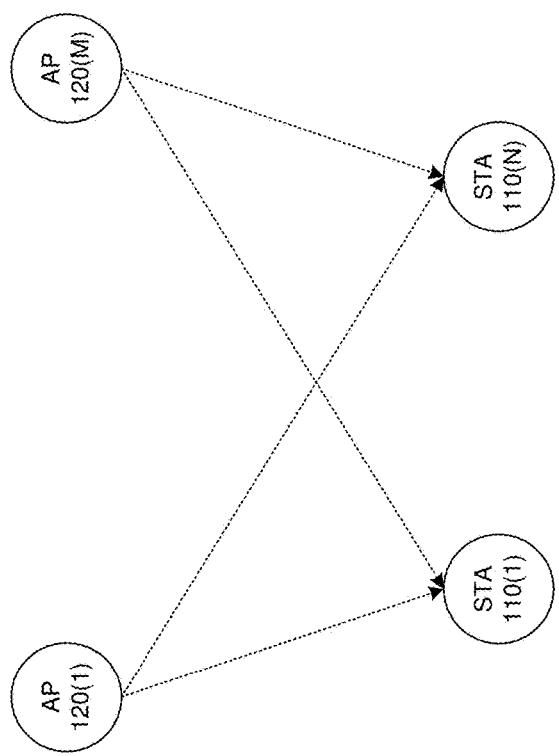
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 25 illustrate examples of implementation of various proposed schemes in network environment 100 in accordance with the present disclosure. The following description of various proposed schemes is provided with reference to FIG. 1~FIG. 25.

Referring to FIG. 1, network environment 100 may involve a number of STAs 110(1)~110(N) associated with, and in wireless communication with, a number of APs 120(1)~120(M) in accordance with one or more IEEE 802.11 standards (e.g., IEEE 802.11be and future-developed standards), with M and N being positive integers greater than 1. Under various proposed schemes in accordance with the present disclosure, STAs 110(1)~110(N) and APs 120 (1)~120(M) may be configured to perform multi-AP CSR protocols and algorithms in wireless communications in accordance with various proposed schemes described below. It is noteworthy that, in the various schemes, protocols and algorithms described in the present disclosure, there are a number of assumptions. One assumption is that each AP does not manage its associated overlapping basic service set (OBSS) STA(s). Another assumption is that APs (e.g., APs 120(1)~120(M)) participating in multi-AP CSR are in wireless communication range of each other. Another assumption is that there is no pre-assigned master AP; however, this does not preclude a designated master AP in case an operator chooses to do so in a deployment. A further assumption is that the owner of a transmission opportunity (TXOP) would orchestrate CSR transmissions in an SR TXOP. An additional assumption is that there is no backhaul coordination between or among the APs participating in multi-AP CSR; instead, coordination between or among the APs may be via over-the-air (OTA) signaling. This assumption, however, does not preclude backhaul coordination in case an operator chooses to do so in a deployment.

In general, high spatial reuse gain may be achieved when two or more links can operate in a condition that the signal-to-interference-plus-noise ratio (SINR) is approximately the same as the signal-to-noise ratio (SNR), or SINR≈SNR. For instance, for a first basic service set (BSS) and a second BSS, or BSS1 and BSS2, respectively, their respective SINR, or SINR1 and SINR2, may be expressed as: SINR1≈SNR1 (i.e., $(\gamma_{11} S1/(\gamma_{21} S2+N1) \approx \gamma_{11} S1/N1))$ and SINR2=SNR2 (i.e., $\gamma_{22} S2/(\gamma_{12} S1+N2) \approx \gamma_{22} S2/N2)$, with S1, S2, N1 and N2 denoting the signal level and noise level of BSS1 and BSS2, respectively. Alternatively, both BSSs may have high path losses ($\gamma_{21}$, $\gamma_{12}$), $\gamma_{21}$ S2<N1 & $\gamma_{12}$ S1<N2. With respect to spatial reuse and transmit (TX) power control, it may be observed that, the SINRs do not improve even when two CSR transmitters reduce their TX power. It may also be observed that a reduction in TX power ($\Delta_x$) from one BSS often results in a smaller increase in SINR ($\Delta_y$) of another BSS (e.g., $\Delta_y < \Delta_x$). Moreover, with respect to data rate versus SINR, it may be observed that every dB of SINR change above a minimum modulation and coding scheme (MCS), or $SINR_0$, can result in 11.3~22.6 Mbps of change in data rate (ΔR) before the peak MCS is reached. After the peak MCS is reached, further increase of SINR cannot increase the data rate ($R_i$). Optimizing $\Sigma_i(SINR_i - SINR_0)$ (in dB) is close to optimizing the sum rate $\Sigma_i R_i$ if the operating point is below the peak MCS and above the minimum MCS (with i denoting the index of BSS).

Under a proposed scheme in accordance with the present disclosure, a first protocol may involve spatial reuse based on a spatial reuse group (SRG). In implementing the first protocol, an AP (e.g., one of APs 120(1)~120(M)) may observe, detect or monitor a power level of signal(s) received from each surrounding different BSS(s) and determine an interference level of the surrounding BSS(s). The AP may select one or more reasonably-far BSSs (e.g., the BSS(s) causing the least interference, or the lowest level of interference, as detected by the AP) to form a SRG, and the AP may decide OBSS power detection (OBSS_PD) parameters associated with high path losses (e.g., higher than a path loss threshold) for the SRG to achieve increased spatial reuse within the SRG. High path loss may lead to low interference on SRG OBSS and high spatial reuse gain. In a first option (Option 1), there may be no need of coordination between APs. In a second option (Option 2), multiple APs may jointly form a SRG (e.g., selected based on interference levels) and agree on a common set of OBSS_PD parameters for fairness.

Under a proposed scheme in accordance with the present disclosure, a second protocol may involve coordinated downlink (DL) spatial reuse. In implementing the second protocol, APs (e.g., APs 120(1)~120(M)) may record the received AP power from each of the coordinated BSS stations (STAs) with high interference. Moreover, each of the APs may estimate its DL interference on an OBSS. Each AP may select one or more reasonably-far BSSs (e.g., the BSS(s) causing the least interference, or the lowest level of interference) for SR coordination. Each of the APs may request its associated STA(s) to report received power (interference) of a list of selected coordinated APs. The STAs may subsequently report update, if needed. Before a master AP among the APs transmits to its recipient STA(s), the master AP may select and inform the coordinated AP(s). The selection may be based on its interference on the OBSS. A list of excluded STA(s) (which may suffer high interference from DL transmissions from the master AP) may be provided by the master AP. The coordinated AP(s) may have a limited number of STAs (with DL data buffered at the respective AP) from which to select. Under the proposed scheme, the master AP would avoid selecting the BSS which would suffer severe interference by the master AP. Accordingly, the master AP and the coordinated AP(s) may perform joint DL SR transmission. For instance, the coordinated AP(s) may select the recipient STA(s) with low interference from the master AP, and the master AP may adjust its MCS based on reported received interference at the recipient STA(s). It is noteworthy that more accurate measurement of interference may be obtained in an event that parameters such as TX power, receiver sensitivity and/or spatial reuse parameter (SRP) are transmitted.

Figure 2:
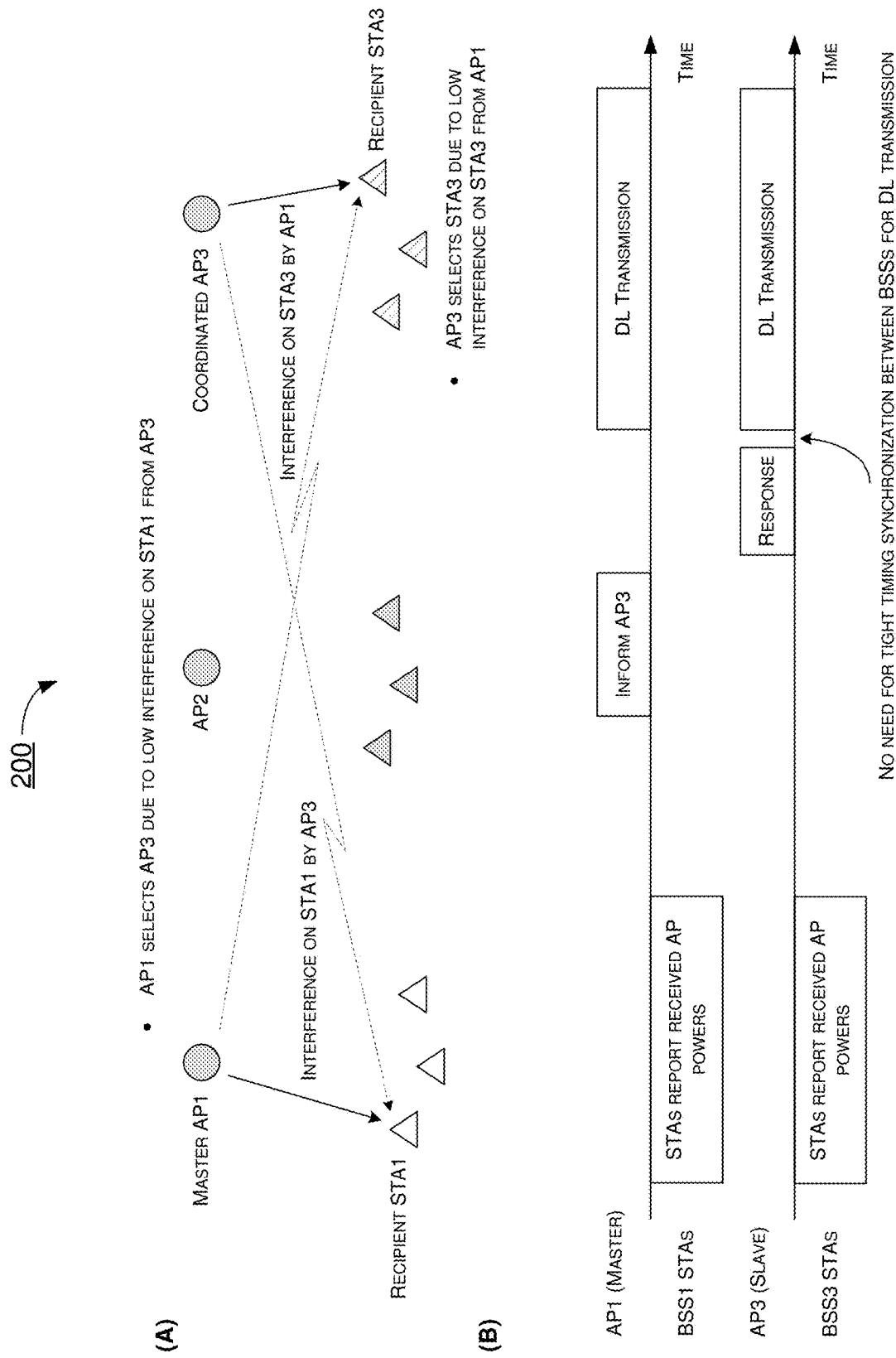
FIG. 2 is a diagram of an example scenario in accordance with an implementation of the present disclosure.

FIG. 2 illustrates an example scenario 200 in accordance with an implementation of the second protocol. Scenario 200 may involve a number of APs, such as AP1, AP2 and AP3, and a number of STAs, including STA1 and STA3. AP1 may be associated with one BSS (denoted as BSS1 in FIG. 2) and AP3 may be associated with another BSS (denoted as BSS3 in FIG. 2). Referring to part (A) of FIG. 2, in scenario 200, AP1 may function as a master AP and AP1 may select AP3 as a coordinated AP due to low interference from AP3 to STA1, which is a recipient of AP1. Moreover, AP3 may select STA3 as a recipient due to low interference from AP1 to STA3. Referring to part (B) of FIG. 2, initially STAs in BSS1 may report received AP powers of a number of APs (e.g., AP1, AP2 and AP3) to AP1 and, similarly, STAs in BSS3 may report received AP powers of a number of APs (e.g., AP1, AP2 and AP3) to AP3. Then, AP1 may inform AP3 that AP3 has been selected as a coordinated AP, and AP3 may transmit a response to AP1 as acknowledgement. Subsequently, both AP1 and AP3 may perform DL transmission with AP1 performing DL transmission to STA1 and AP3 performing DL transmission to STA3. There may be no need for tight timing synchronization between BSS1 and BSS3 for the DL transmissions.

Under a proposed scheme in accordance with the present disclosure, a third protocol may involve coordinated uplink (UL) spatial reuse. In implementing the third protocol, APs (e.g., APs 120(1)~120(M)) may report the received power from the coordinated BSS STAs with high interference. Each of the APs may request its associated STA(s) to report the received power (interference) and parameters of a list of coordinated APs. It is noteworthy that in case the parameters such as TX power, receiver sensitivity and/or SRP are also transmitted by the AP, the interference level by a given STA to a neighboring AP may be calculated more precisely. The STAs may subsequently report update, if necessary. The master AP may decide to trigger one or more of its associated STAs selected for UL transmission. The master AP may also select coordinate AP(s) having the least interference, or the lowest level of interference, from the selected STA(s) triggered by the master AP for UL transmission (e.g., based on the reports from the selected STA(s)). The master AP may inform the BSS(s) associated with the coordinated AP(s) with a list of excluded STAs (which would cause high interference on the master AP) in the selected BSS. Each of the coordinated AP(s) may select, among non-excluded STAs (which would not cause high interference on the master AP), one or more of its associated STAs for UL transmission. Then, the master AP and the coordinated AP(s) may trigger coordinated joint UL SR transmission from the selected STAs. It is noteworthy that an "acceptable interference level" in SRP may allow an AP to control the amount of interference it can sustain, with a tradeoff between an increase in interference level and an increase of spatial reuse.

Figure 3:
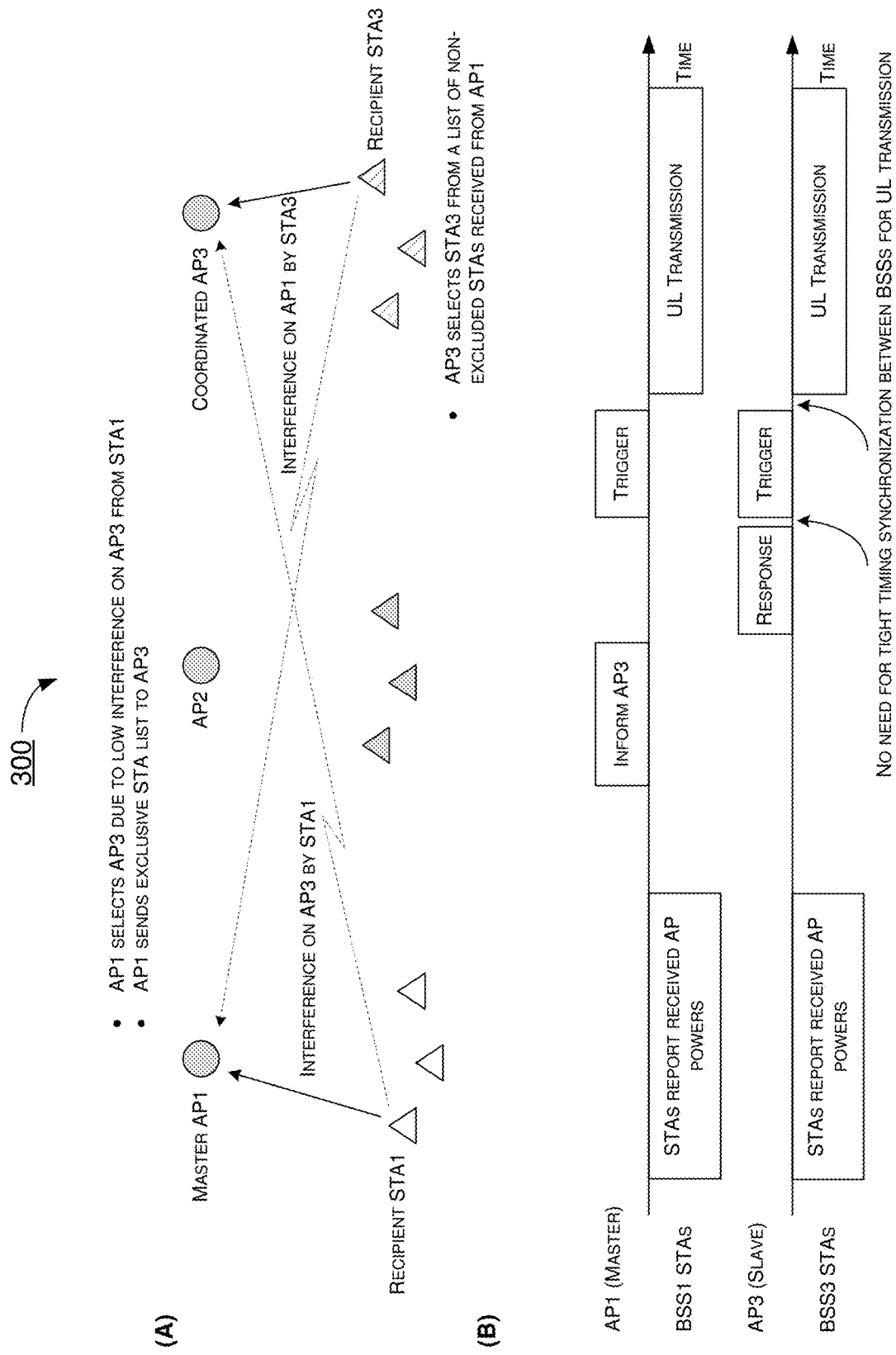
FIG. 3 is a diagram of an example scenario in accordance with an implementation of the present disclosure.

FIG. 3 illustrates an example scenario 300 in accordance with an implementation of the third protocol. Scenario 300 may involve a number of APs, such as AP1, AP2 and AP3, and a number of STAs, including STA1 and STA3. AP1 may be associated with one BSS (denoted as BSS1 in FIG. 3) and AP3 may be associated with another BSS (denoted as BSS3 in FIG. 3). Referring to part (A) of FIG. 3, in scenario 300, AP1 may function as a master AP and AP1 may select AP3 as a coordinated AP due to low interference from STA1 to AP3. AP1 may send a list of excluded STAs to AP3. Moreover, AP3 may select STA3 as a recipient from a list of non-excluded STAs based on the list received from AP1. Referring to part (B) of FIG. 3, initially STAs in BSS1 may report received AP powers (and SRPs, if available) of a number of APs (e.g., AP1, AP2 and AP3) to AP1 and, similarly, STAs in BSS3 may report received AP powers (and SRPs, if available) of a number of APs (e.g., AP1, AP2 and AP3) to AP3. Then, AP1 may inform AP3 with a list of excluded (or non-excluded) STAs, and AP3 may transmit a response to AP1 as acknowledgement. Subsequently, each of AP1 and AP3 may transmit an UL trigger to its associated STAs to trigger UL transmissions in BSS1 and BSS3. There may be no need for tight timing synchronization between BSS1 and BSS3 for the UL triggers and UL transmissions.

Under a proposed scheme in accordance with the present disclosure, a fourth protocol may involve coordinated UL spatial reuse with TX power control. In implementing the fourth protocol, all coordinated APs may request their associated STAs to observe the received power level of a list of the coordinated APs. It is noteworthy that, in case parameters such as TX power, receiver sensitivity and/or SRP are also transmitted by the AP, the interference level from a given STA to its neighboring AP may be calculated more precisely. The master AP may select, based on the report(s) from its selected recipient STA(s), the coordinated AP(s) and inform the coordinated AP(s) about SR opportunity and the SRP of the master AP. The master AP may adjust the "acceptable interference level" in the SRP to tradeoff its interference level and the higher throughput (TX power level) for the coordinated BSS(s). Accordingly, the master AP and the coordinated AP(s) may trigger UL transmissions. For instance, each of the coordinated AP(s) may transmit the SRP of the master AP to its associated STAs in the UL trigger. Moreover, each of the triggered UL STA(s) in the coordinated BSS(s) may control its TX power based on the received SRP of the master AP.

Figure 4:
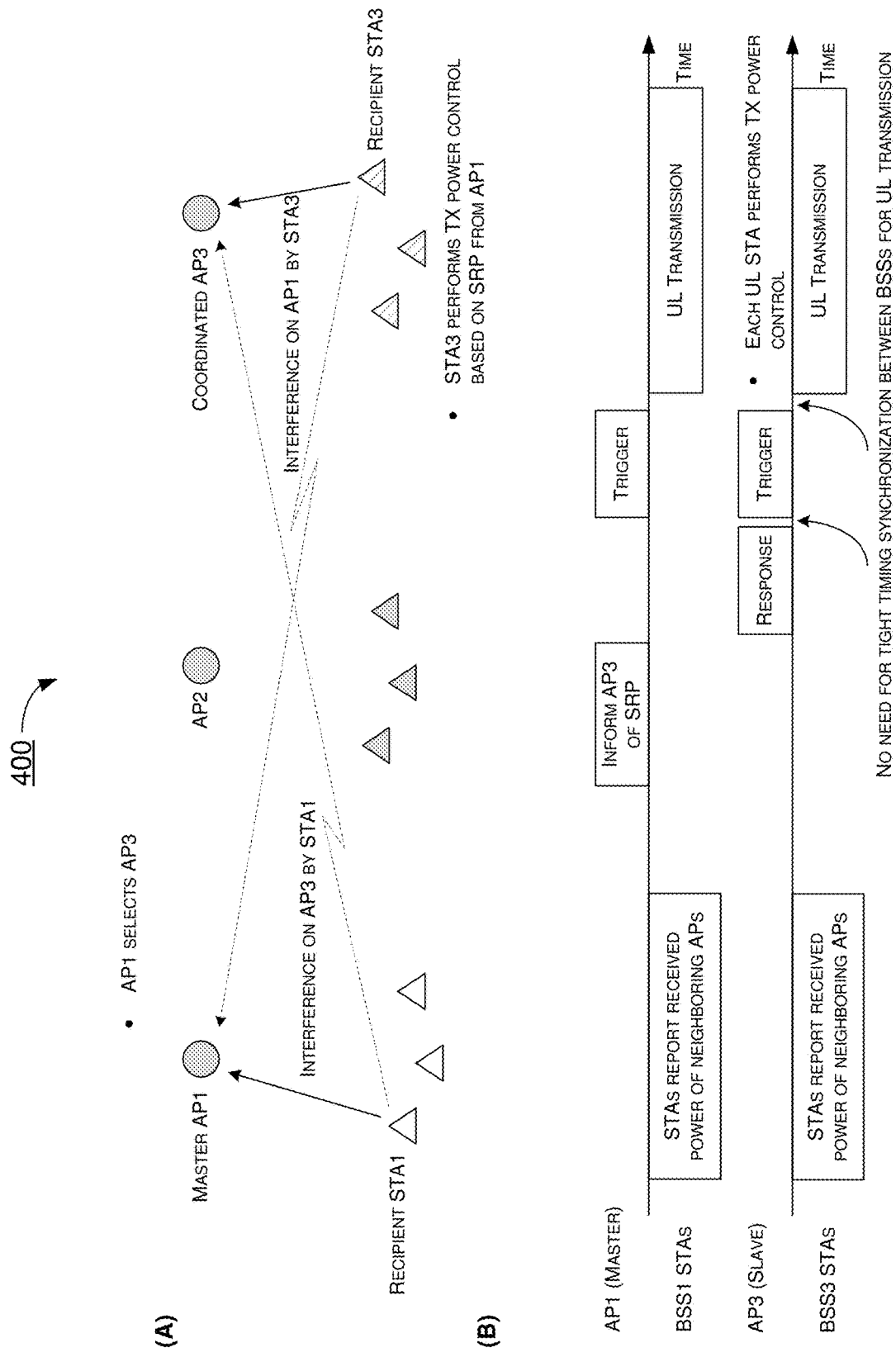
FIG. 4 is a diagram of an example scenario in accordance with an implementation of the present disclosure.

FIG. 4 illustrates an example scenario 400 in accordance with an implementation of the fourth protocol. Scenario 400 may involve a number of APs, such as AP1, AP2 and AP3, and a number of STAs, including STA1 and STA3. AP1 may be associated with one BSS (denoted as BSS1 in FIG. 4) and AP3 may be associated with another BSS (denoted as BSS3 in FIG. 4). Referring to part (A) of FIG. 4, in scenario 400, AP1 may function as a master AP and AP1 may select AP3 as a coordinated AP. STA1 may be a recipient of AP1, and STA3 may be a recipient of AP3. In scenario 400, STA3 may perform TX power control based on the SRP of AP1. Referring to part (B) of FIG. 4, initially STAs in BSS1 may report received AP powers of neighboring APs (e.g., AP2 and AP3) and, similarly, STAs in BSS3 may report received AP powers of neighboring APs (e.g., AP1 and AP2). Then, AP1 may inform AP3 of the SRP of AP1, and AP3 may transmit a response to AP1 as acknowledgement. Subsequently, each of AP1 and AP3 may transmit an UL trigger to its associated STAs to trigger UL transmissions in BSS1 and BSS3. The STA(s) in BSS1 performing the UL transmission (e.g., STA3) may perform TX power control based on the SRP of AP1. There may be no need for tight timing synchronization between BSS1 and BSS3 for the UL triggers and UL transmissions.

Under a proposed scheme in accordance with the present disclosure, a fifth protocol may involve joint UL transmission with receiver interference cancellation. In implementing the fifth protocol, each AP may have more antennas for performing receiver interference cancellation. The master AP may select and inform coordinated AP(s) for a CSR UL transmission with receiver interference cancellation. The number of UL STAs from the coordinated BSS(s) may be limited by the number of AP antennas. Accordingly, the master AP and coordinated AP(s) may trigger UL transmission in their respective BSSs. The UL Physical Layer Conformance Procedure (PLCP) Protocol Data Units (PPDUs) from all UL STAs may carry resolvable (e.g., jointly orthogonal) long training fields (LTFs) to allow the master AP and coordinated AP(s) to cancel interference from the STAs in the coordinated BSS(s).

Figure 5:
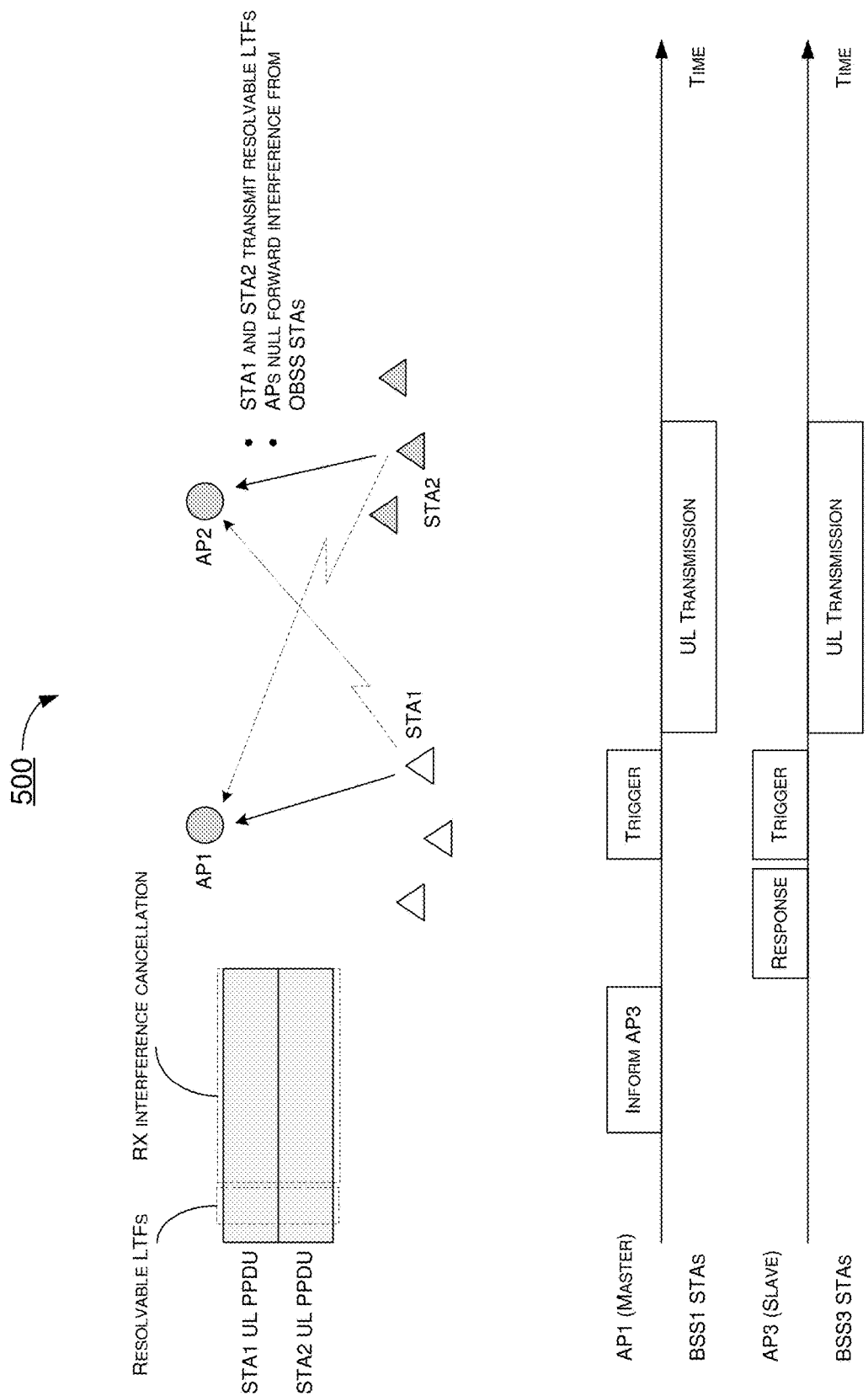
FIG. 5 is a diagram of an example scenario in accordance with an implementation of the present disclosure.

FIG. 5 illustrates an example scenario 500 in accordance with an implementation of the fifth protocol. Scenario 500 may involve a number of APs, such as AP1 and AP2, and a number of STAs, including STA1 and STA2. In scenario 500, AP1 and AP2 may use receiver nulling (e.g., with CBF) to cancel out interference from OBSS STA(s) during joint UL transmission. AP1 and AP2 may decide on the spatial dimensions, or ranks, for receiving UL transmissions of their respective BSSs and nulling OBSS. AP1 and AP2 may also determine a joint p-matrix at this point. In the UL transmission, each UL STA in the two coordinated BSSs may have unique orthogonal vectors (e.g., p-matrix) from joint LTFs or resolvable LTFs to allow resolving of all UL transmissions of own BSS and OBSS. Each of AP1 and AP2 may null or otherwise cancel interference from its respective OBSS (e.g., with CBF) during its UL reception.

Figure 6:
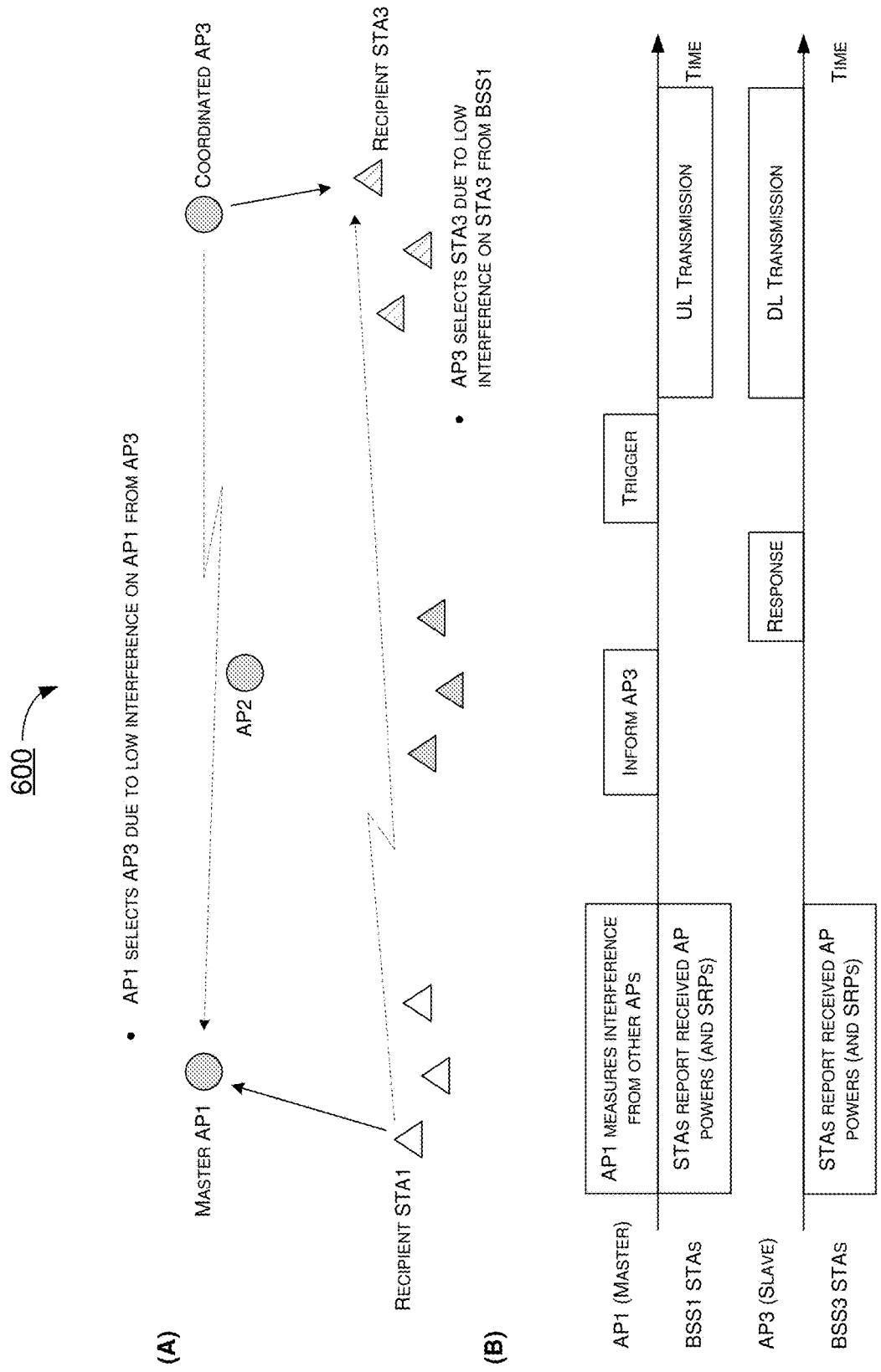
FIG. 6 is a diagram of an example scenario in accordance with an implementation of the present disclosure.

FIG. 6 illustrates an example scenario 600 in accordance with an implementation of the present disclosure. Scenario 600 may involve coordinated SR UL-DL transmissions. Scenario 600 may involve a number of APs, such as AP1, AP2 and AP3, and a number of STAs, including STA1 and STA3. AP1 may be associated with one BSS (denoted as BSS1 in FIG. 6) and AP3 may be associated with another BSS (denoted as BSS3 in FIG. 6). Referring to part (A) of FIG. 6, in scenario 600, AP1 may function as a master AP and AP1 may select AP3 as a coordinated AP due to low interference on AP1 from AP3. STA1 may be a recipient of AP1, and STA3 may be a recipient of AP3. In scenario 600, AP3 may select STA3 as a recipient due to low interference on STA3 from BSS1. Referring to part (B) of FIG. 6, initially AP1 may measure interference from other APs (e.g., AP2 and AP3). Also, STAs in BSS1 may report received AP powers (and SRPs, if available) of neighboring APs (e.g., AP2 and AP3) and, similarly, STAs in BSS3 may report received AP powers (and SRPs, if available) of neighboring APs (e.g., AP1 and AP2). Then, AP1 may inform AP3 of the selection of AP3 as a coordinated AP, and AP3 may transmit a response to AP1 as acknowledgement. Subsequently, AP1 may transmit an UL trigger to its associated STAs to trigger UL transmissions in BSS1. Simultaneously, AP3 may perform DL transmission to STA(s) in BSS3.

Figure 7:
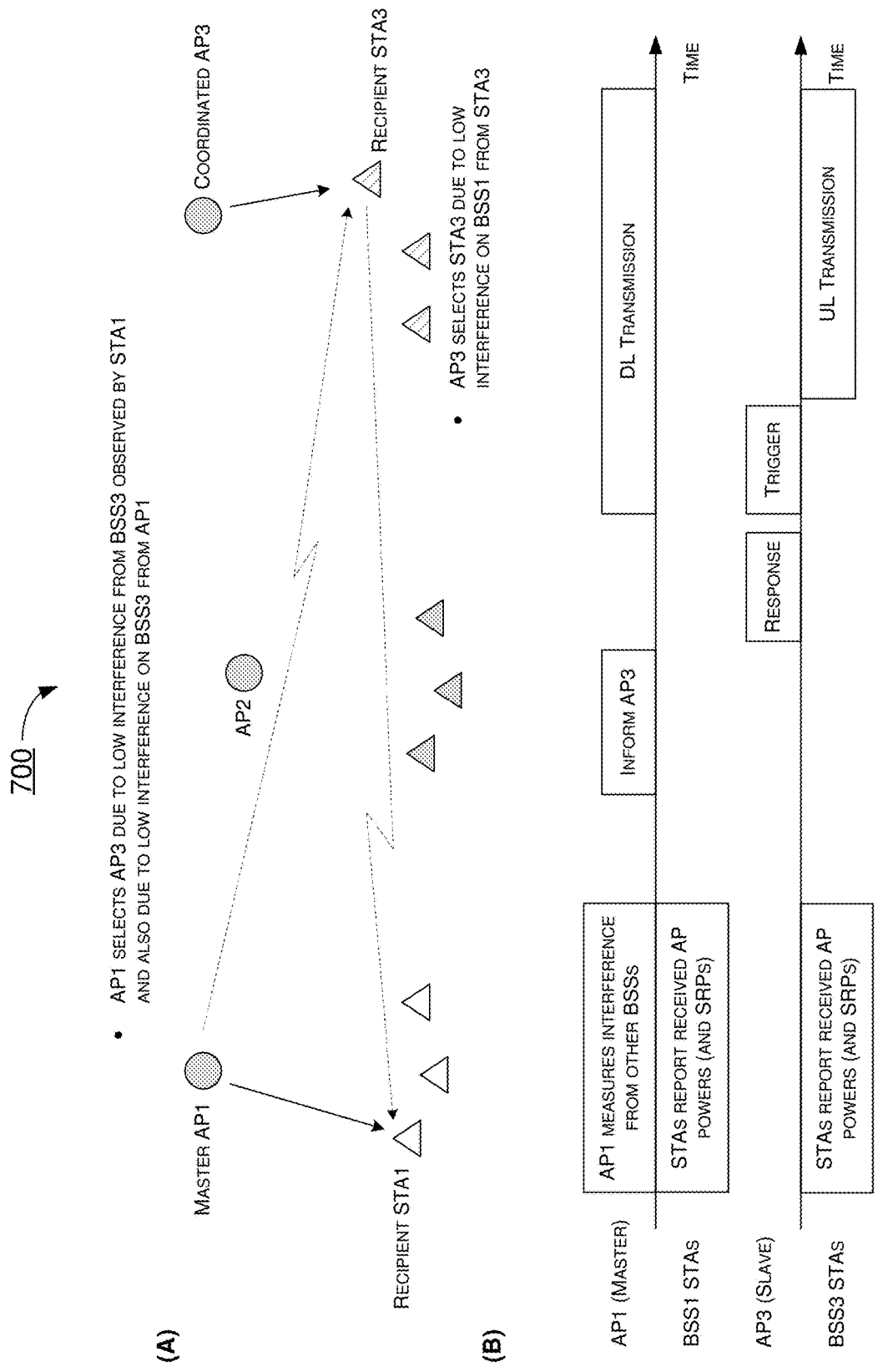
FIG. 7 is a diagram of an example scenario in accordance with an implementation of the present disclosure.

FIG. 7 illustrates an example scenario 700 in accordance with an implementation of the present disclosure. Scenario 700 may involve coordinated SR DL-UL transmissions. Scenario 700 may involve a number of APs, such as AP1, AP2 and AP3, and a number of STAs, including STA1 and STA3. AP1 may be associated with one BSS (denoted as BSS1 in FIG. 7) and AP3 may be associated with another BSS (denoted as BSS3 in FIG. 7). Referring to part (A) of FIG. 7, in scenario 700, AP1 may function as a master AP and AP1 may select AP3 as a coordinated AP due to STA1 observing low interference from BSS3 and also due to AP1 causing low interference on BSS3. STA1 may be a recipient of AP1, and STA3 may be a recipient of AP3. In scenario 700, AP3 may select STA3 as a recipient due to low interference on BSS1 from STA3. Referring to part (B) of FIG. 7, initially AP1 may measure interference from other BSSs (e.g., at least BSS3). Also, STAs in BSS1 may report received AP powers (and SRPs, if available) of neighboring APs (e.g., AP2 and AP3) and, similarly, STAs in BSS3 may report received AP powers (and SRPs, if available) of neighboring APs (e.g., AP1 and AP2). Then, AP1 may inform AP3 of the selection of AP3 as a coordinated AP, and AP3 may transmit a response to AP1 as acknowledgement. Subsequently, AP3 may transmit an UL trigger to its associated STAs to trigger UL transmissions in BSS3. Moreover, AP1 may perform DL transmission to STA(s) in BSS1 during the same period of time.

Figure 8:
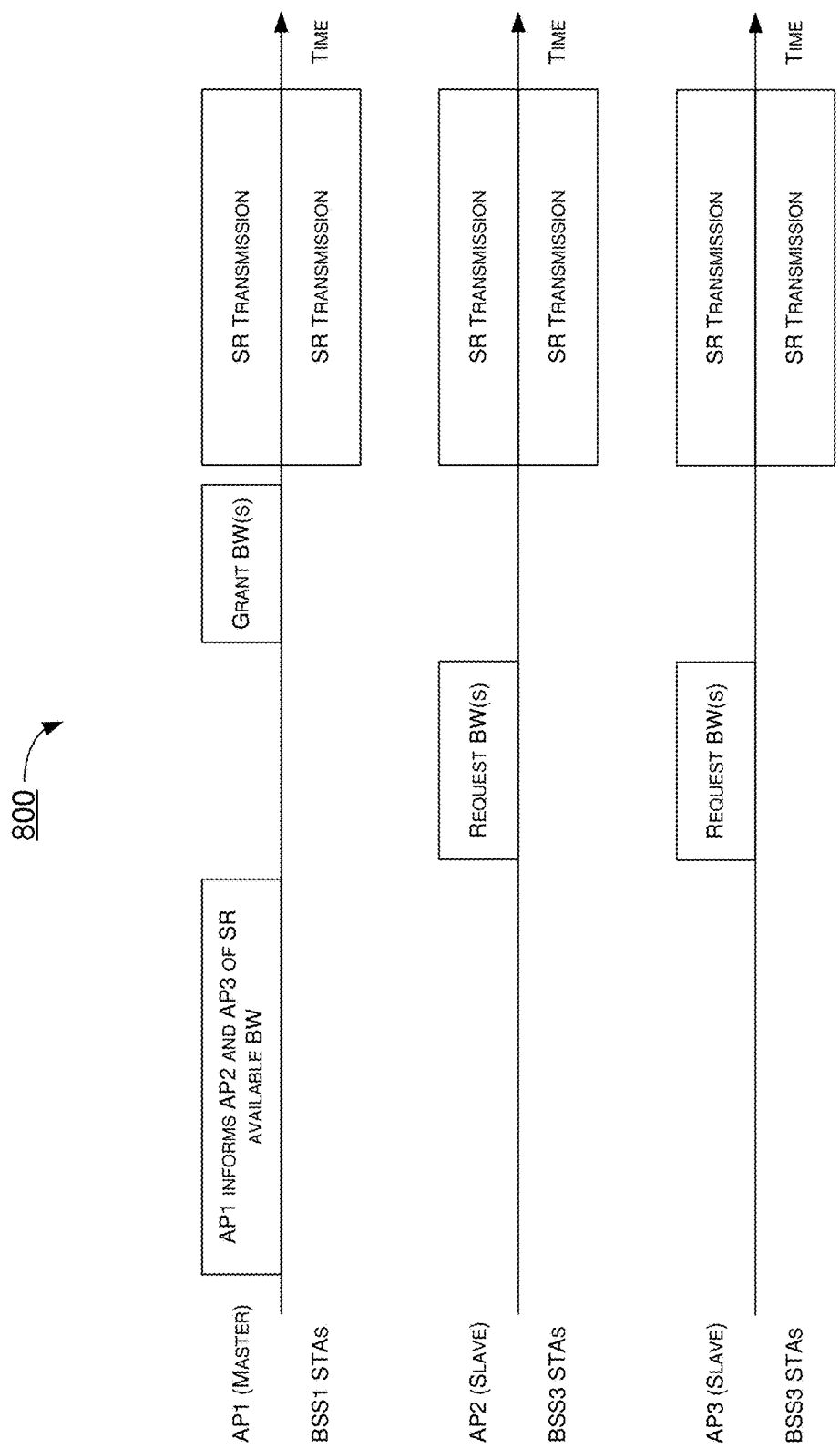
FIG. 8 is a diagram of an example scenario in accordance with an implementation of the present disclosure.

FIG. 8 illustrates an example scenario 800 in accordance with an implementation of the present disclosure. Under a proposed scheme in accordance with the present disclosure, CSR may be combined with OFDMA. Under the proposed scheme, available resource units (RUs) may be separated into dedicated RUs and shared RUs, and one or more of the proposed protocols of the present disclosure may be applied to the shared RUs. Moreover, each of the shared RUs may be utilized in CSR with different coordinated AP(s). Accordingly, scenario 800 shows an example of SR and bandwidth (BW) resource negotiation among APs for OFDMA and various protocols of the present disclosure. Referring to FIG. 8, initially AP1, as the master AP, may inform AP2 and AP3 of available bandwidth(s) for spatial reuse. In response, each of AP2 and AP3 may request for some or all of the available bandwidth(s), and AP1 may grant some or all of the available bandwidth(s). Subsequently, AP1, AP2 and AP3 may perform SR transmissions with OFDM in conjunction with one or more of the proposed protocols of the present disclosure.

Figure 9:
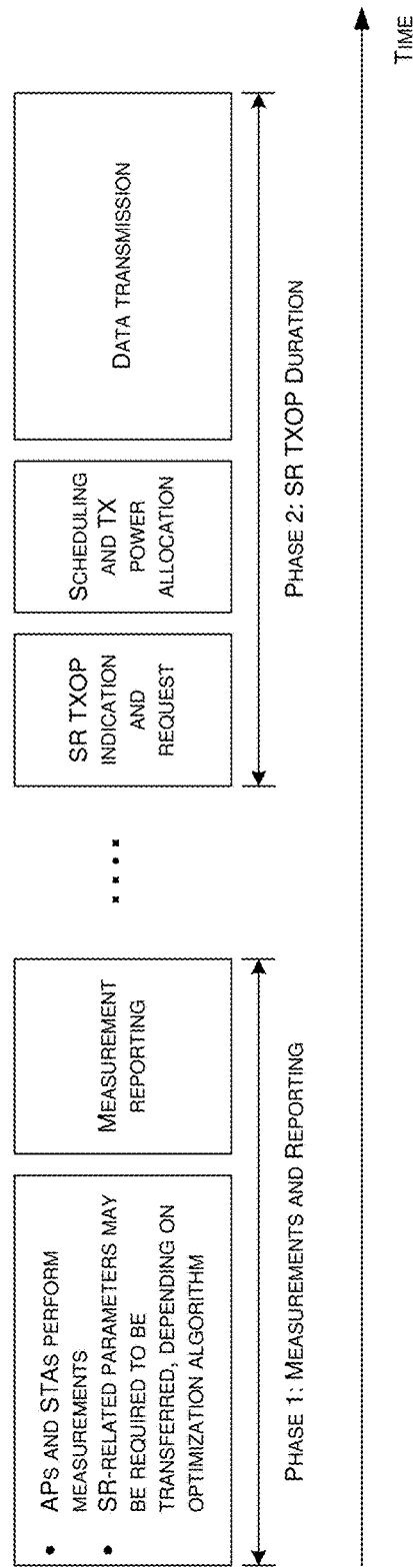
FIG. 9 is a diagram of an example scenario in accordance with an implementation of the present disclosure.

FIG. 9 illustrates an example scenario 900 of a phase of CSR protocol for measurements and reporting in accordance with an implementation of the present disclosure. Under a proposed scheme in accordance with the present disclosure, with respect to measurements, APs and STAs participating in CSR may perform OBSS measurements. For instance, a master AP may request participating AP(s) and STA(s) to perform OBSS measurements by transmitting a Measurement Request element. Additionally, under the proposed scheme, each of the participating STAs may report OBSS measurements to its associated AP in a Measurement Report element. For instance, the reporting may be requested by participating APs or initiated by the participating STAs. Moreover, under the proposed scheme, AP-to-AP information exchange may be performed. That is, participating APs may exchange measurement reports. In some cases, information exchange between APs may not be required by some SR optimization algorithm(s). It is noteworthy that the OBSS measurements may depend on the SR optimization algorithm deployed. For instance, with respect to OBSS measurement by APs, a beacon report (e.g., Measurement Report element) may provide the BSS identification (BSSID), channel number(s), received channel power indicator (RCPI) and received signal-to-noise indicator (RSNI), and under some SR optimization algorithm such beacon report may not be required. With respect to OBSS measurement by STAs, measurements of OBSS STAs may be difficult because OBSS STAs may not necessarily perform transmission during measurement duration. Some SR optimization algorithms may require parameters (e.g., TX power, receiver sensitivity and/or SRP) to be transmitted. Referring to FIG. 9, in Phase 1, during which measurements and reporting are performed, participating APs and STAs may perform measurements, and SR related parameters may be required to be transferred depending on the SR optimization algorithm. Moreover, in Phase 1, participating STAs may report their OBSS measurements to their associated APs, respectively. In Phase 2, which is denoted as SR TXOP duration in FIG. 9, SR TXOP indication and request may be transmitted, followed by scheduling and TX power allocation, followed by data transmission (UL and/or DL).

Figure 10:
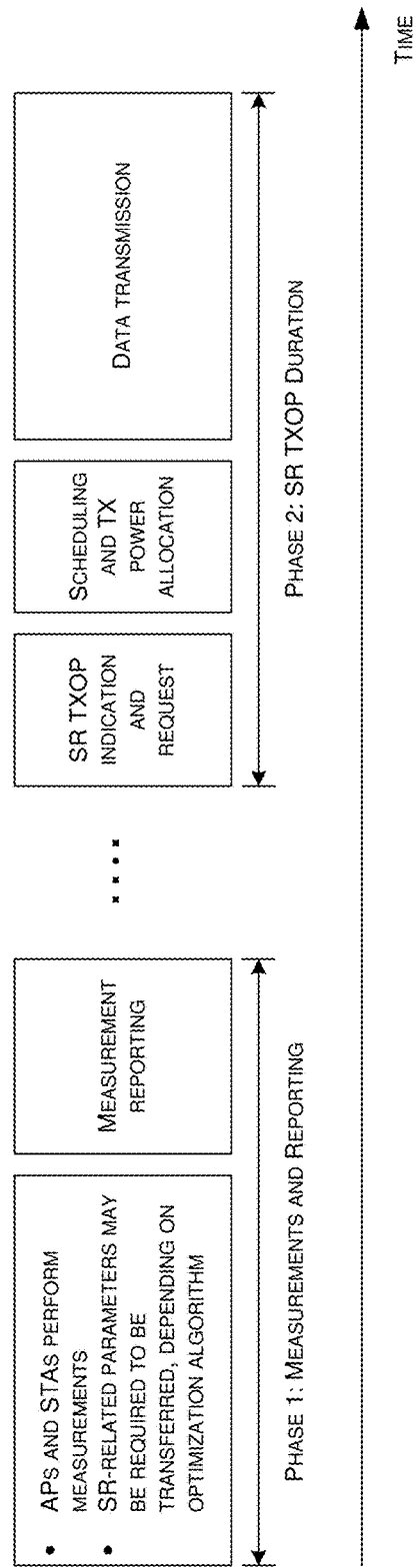
FIG. 10 is a diagram of an example scenario in accordance with an implementation of the present disclosure.

FIG. 10 illustrates an example scenario 1000 of a phase of CSR protocol for SR TXOP duration in accordance with an implementation of the present disclosure. Under a proposed scheme in accordance with the present disclosure, with respect to SR TXOP indication and request, a TXOP owner may transmit an indication to inform selected neighboring APs of an obtained SR TXOP. The neighboring APs may transmit a request to inform the TXOP owner their intent to participate in an SR TX. The neighboring APs may also provide the required SR information from OBSS measurements to the TXOP owner for SR throughput optimization, as the type of SR information may depend on the SR algorithm in use. Under the proposed scheme, with respect to allocation of SR transmission schedule and TX power levels, the TXOP owner may allocate to neighboring APs the subchannels, TX power levels, TXOP duration, and TX start time. Participating APs may inform their associated STAs of the allocated subchannels as well as the allocated TXOP duration and TX start time. Under the proposed scheme, with respect to SR data transmission, participating APs may transmit (with TX power control) on their respective allocated subchannels for the allocated TXOP duration begging at the TX start time. Referring to FIG. 10, in Phase 1, during which measurements and reporting are performed, participating APs and STAs may perform measurements, and SR related parameters may be required to be transferred depending on the SR optimization algorithm. Moreover, in Phase 1, participating STAs may report their OBSS measurements to their associated APs, respectively. In Phase 2, which is denoted as SR TXOP duration in FIG. 10, SR TXOP indication and request may be transmitted, followed by scheduling and TX power allocation, followed by data transmission (UL and/or DL).

Figure 11:
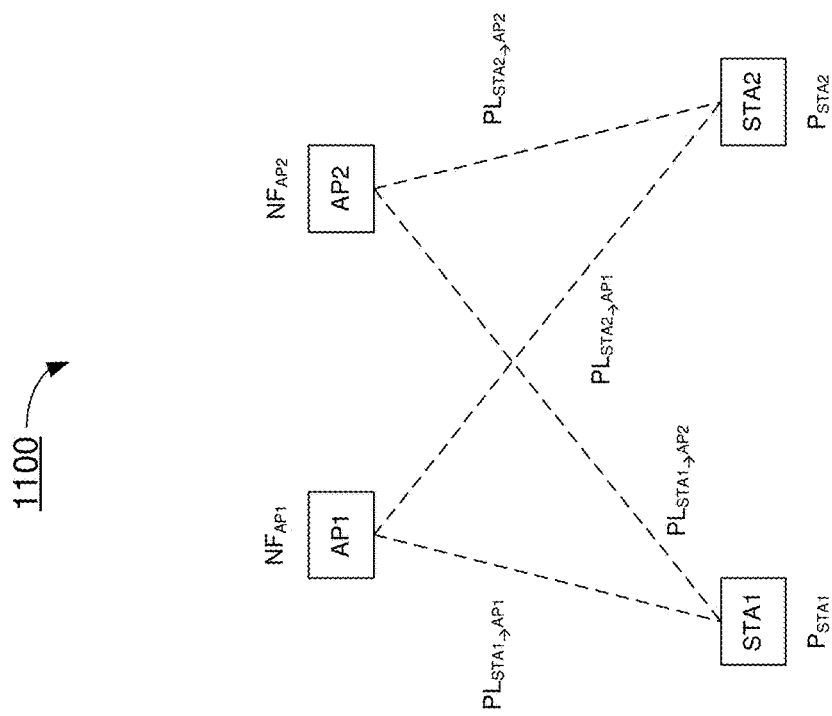
FIG. 11 is a diagram of an example scenario in accordance with an implementation of the present disclosure.

FIG. 11 illustrates an example scenario 1100 of UL SR in accordance with an implementation of the present disclosure. Under a proposed scheme in accordance with the present disclosure, the SR UL operation may be based on a SR optimization algorithm described below. The TXOP owner (e.g., master AP) may determine TX power control based on maximum sum rate criteria as follows:

$$MAX_{\Delta TX\_PWR1, \Delta TX\_PWR2, \Delta TX\_PWR2 \ldots} (SUM(R_1+R_2+R_3 \ldots))$$

Here, $\Delta TX\_PWR_1$, $\Delta TX\_PWR_2$, $\Delta TX\_PWR_3$ denote TX power adjustment of the UL transmitting STAs, and SUM $(R_1+R_2+R_3 \ldots)$ denotes the sum rate of the SR transmitting BSSs. The TXOP owner may select SR BSSs based on the interference on the intended recipient STA(s).

Under the proposed scheme, information of space losses for each SR link may be necessary at the master AP in implementing the SR optimization algorithm. Referring to FIG. 11, scenario 1100 may involve AP1, AP2, STA1 and STA2. In scenario 1100, information of space losses for all SR links may involve the following: $PL_{AP1 \rightarrow STA1}$ and $PL_{AP2 \rightarrow STA1}$ at the receiver of STA1, and $PL_{AP1 \rightarrow STA2}$ and $PL_{AP2 \rightarrow STA2}$ at the receiver of STA2. Space losses may be derived from received power of trigger frames at the STA and AP TX power in the common field of the OFDMA trigger frame. STA1 may report its measured space losses and its maximum TX power $P_{STA1}$ to AP1, and STA2 may report its measured space losses (or received beacon powers) and its maximum TX power $P_{STA2}$ to AP2. The master AP (e.g., AP1) may collect the noise floor of AP2, $NF_{AP2}$, and measured space losses (or received beacon powers), and the master AP may also collect the max TX powers from the STAs from neighboring APs. It is noteworthy that an alternate way for each STA to estimate the space loss may be to measure the received OBSS beacon power and report to its associated AP. The neighboring OBSS APs may transfer the noise floors of associated STAs, beacon TX powers of the AP, and received beacon power measured by STAs to the master AP.

Figure 12:
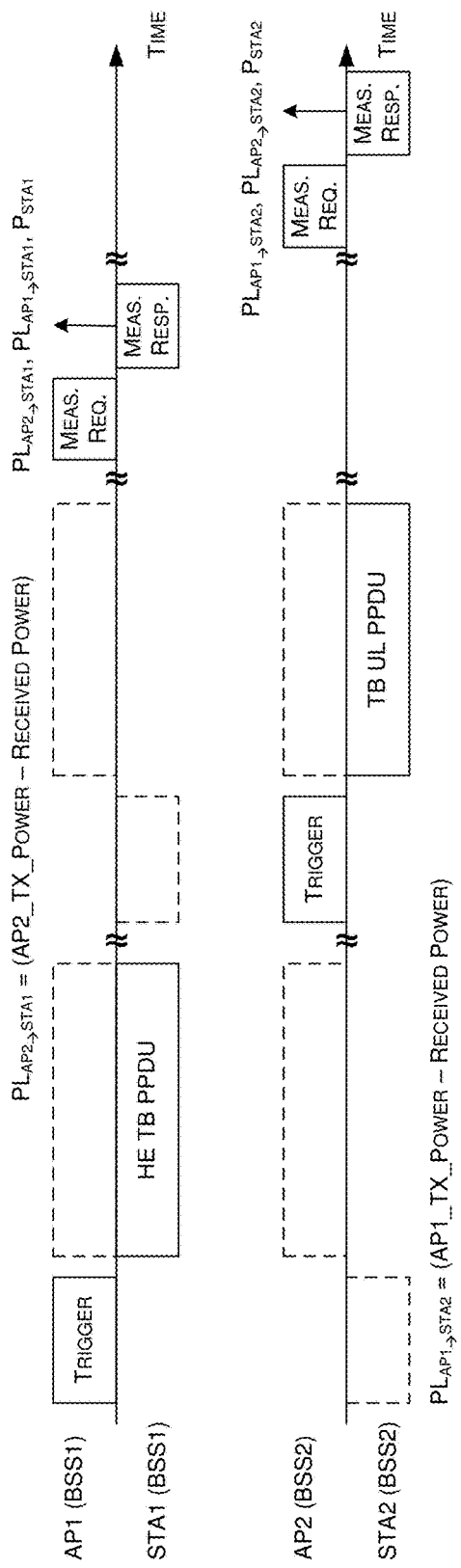
FIG. 12 is a diagram of an example scenario in accordance with an implementation of the present disclosure.

FIG. 12 illustrates an example scenario 1200 of phase 1 of UL SR in accordance with an implementation of the present disclosure. Under a proposed scheme in accordance with the present disclosure, each AP may request its associated STAs to perform SR measurements (e.g., path losses from its own AP and OBSS AP(s)) and report the measurements. For instance, at step 1 (related to measurements), two options (e.g., option 1 and option 2) may be undertaken. In option 1, each AP may use a Measurement Request element to request its associated STAs to perform measurements, and the STAs may report the OBSS AP measurements using a Beacon Report element. In option 2, the STAs may measure the received power from OBSS trigger frames and calculate the space loss based on AP TX power in the common field of the OFDMA trigger frame. At step 2 (related to reporting), each of the STAs may report the measured space losses (or measured beacon power) and its maximum TX power to its associated AP.

Figure 13:
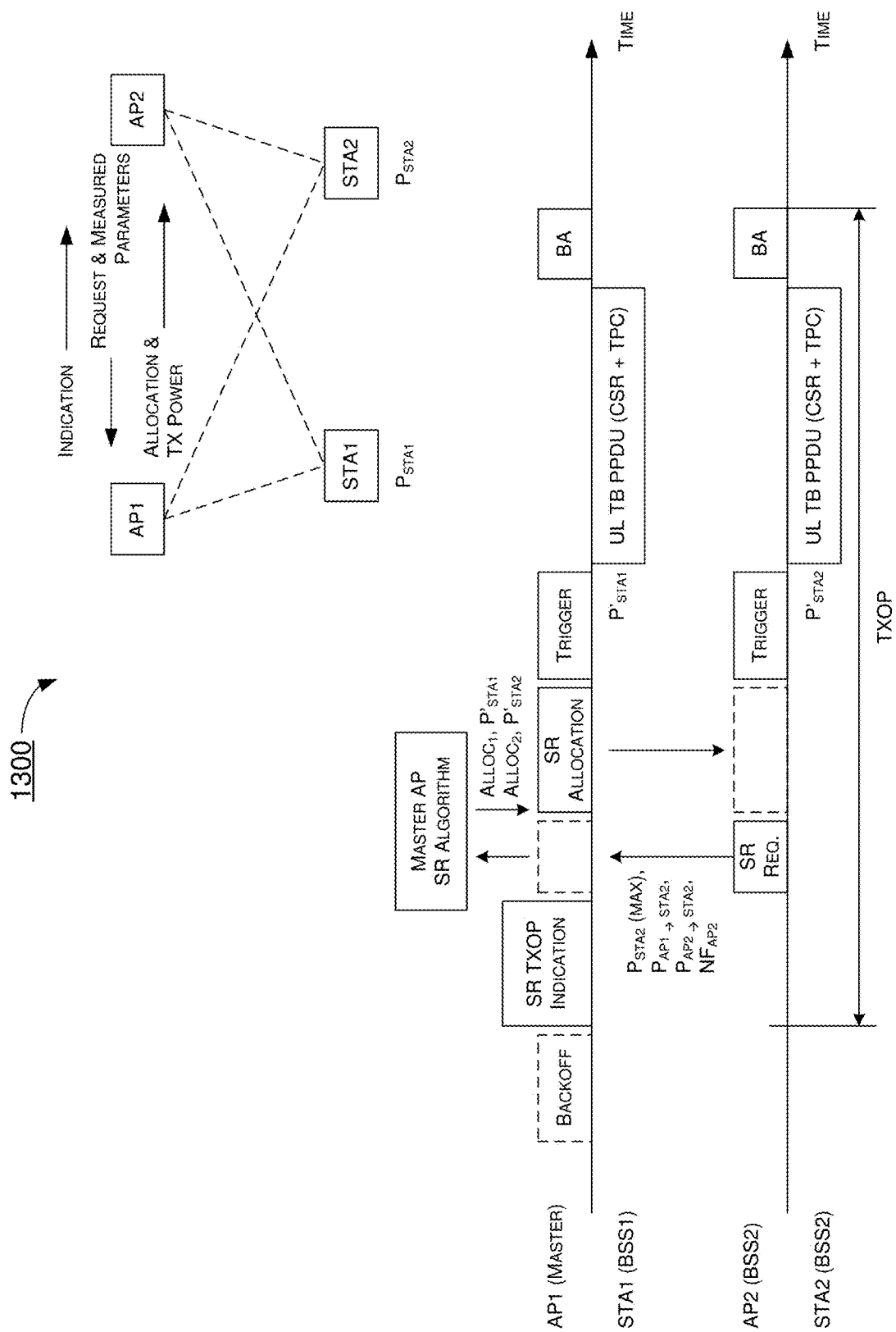
FIG. 13 is a diagram of an example scenario in accordance with an implementation of the present disclosure.
Figure 14:
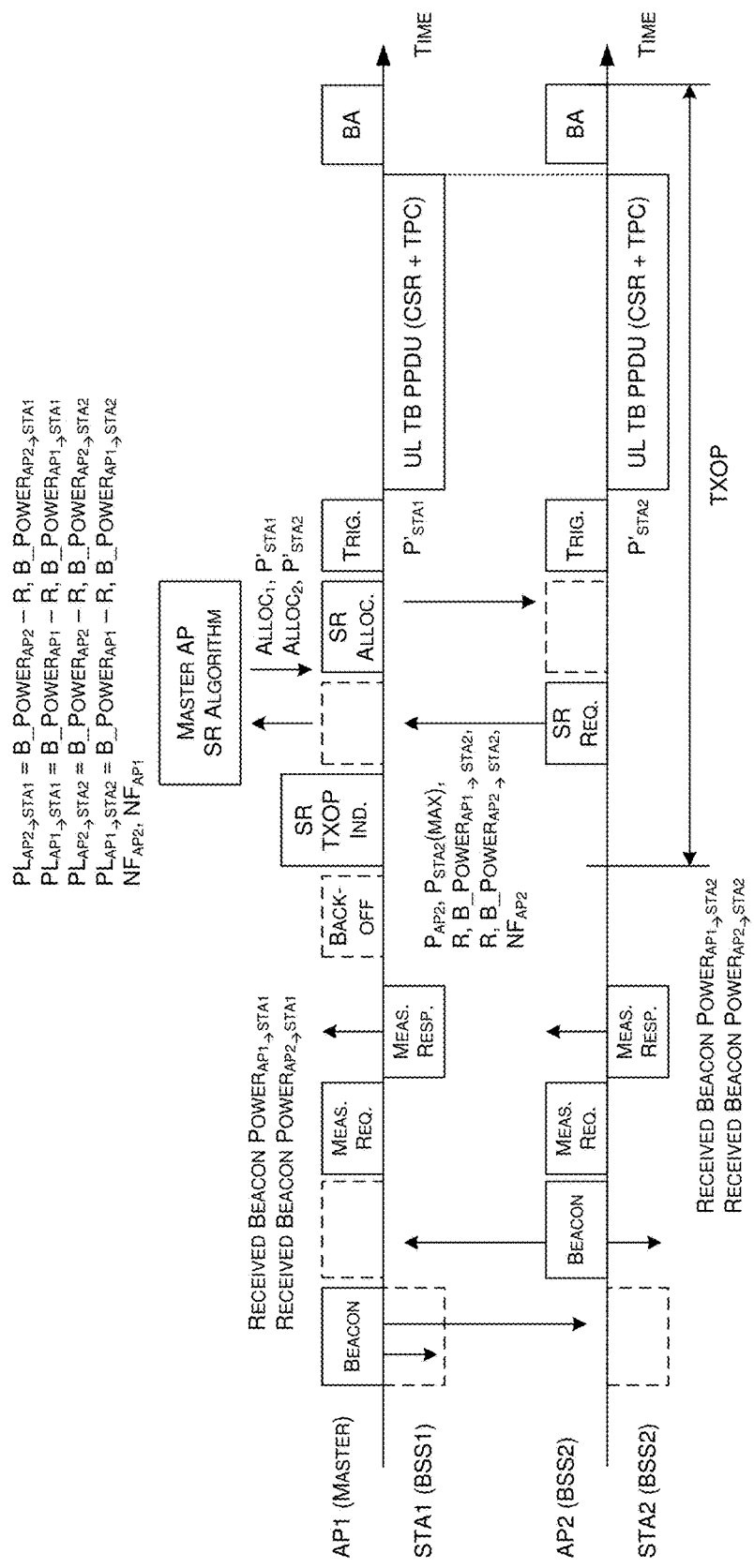
FIG. 14 is a diagram of an example scenario in accordance with an implementation of the present disclosure.

FIG. 13 illustrates an example scenario 1300 of phase 2 of UL SR in accordance with an implementation of the present disclosure. FIG. 14 illustrates an example scenario 1400 of an alternative method to derive space losses in accordance with an implementation of the present disclosure. Referring to FIG. 13 and FIG. 14, scenario 1300 and scenario 1400 may involve AP1, AP2, STA1 and STA2. Under a proposed scheme in accordance with the present disclosure, with respect to SR TXOP indication and request, the TXOP owner (e.g., AP1 as the master AP) may transmit an indication to inform selected neighboring AP(s) of an obtained SR TXOP. The neighboring AP(s) may be selected based on the measured report(s) from the intended recipient STA(s) of the TXOP owner. The neighboring AP(s) (e.g., AP2) may transmit a request to inform the TXOP owner (e.g., AP1) their intent to participate in an SR TX and provide information such as $P_{STA2}(max)$, $PL_{AP2\text{-}STA2}$, $PL_{AP1 \to STA2}$, and its $NF_{AP2}$. Alternatively, the received beacon powers and beacon TX power level may be provided. Under the proposed scheme, with respect to SR allocation, the TXOP owner may allocate the SR transmission schedule and the required TX power levels (e.g., $P'_{STA1}$, $P'_{STA2}$), which may be calculated from the SR algorithm, to the selected neighboring AP(s). Moreover, with respect to SR transmission, SR APs may transmit UL trigger frames, and SR STAs may transmit UL data with allocated TX power levels ($P'_{STA1}$, $P'_{STA2}$).

Figure 15:
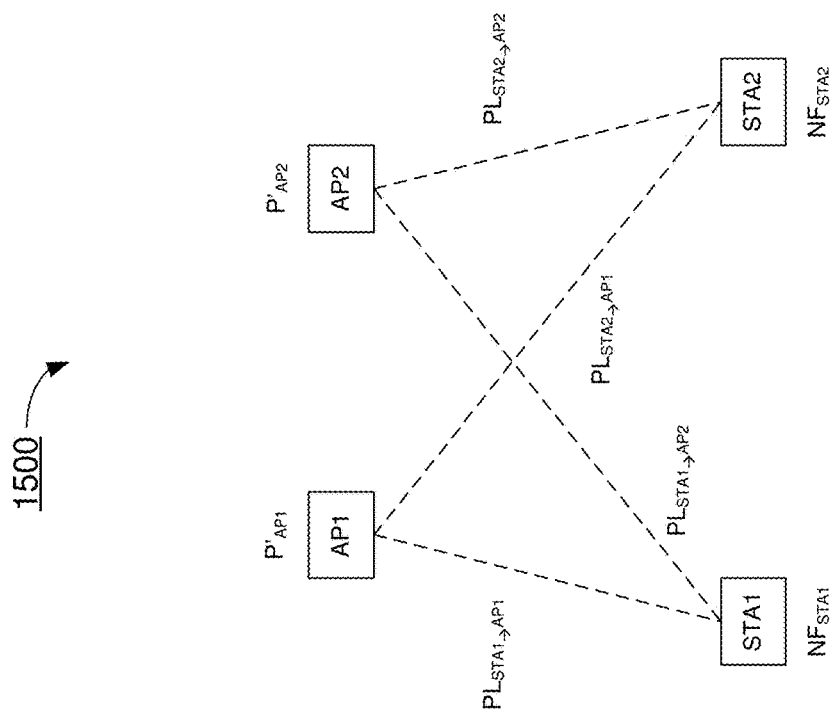
FIG. 15 is a diagram of an example scenario in accordance with an implementation of the present disclosure.

FIG. 15 illustrates an example scenario 1500 of DL SR in accordance with an implementation of the present disclosure. Under a proposed scheme in accordance with the present disclosure, the SR DL operation may be based on a SR optimization algorithm described below. The TXOP owner (e.g., master AP) may determine TX power control of neighboring APs based on maximum sum rate criteria as follows:

$$MAX_{\Delta TX\_PWR1, \Delta TX\_PWR2, \Delta TX\_PWR2 \ldots} (SUM(R_1+R_2+R_3 \ldots))$$

Here, $\Delta TX\_PWR_1$, $\Delta TX\_PWR_2$, $\Delta TX\_PWR_3$ denote TX power adjustment of the DL transmitting STAs, and SUM ($R_1+R_2+R_3 \ldots$) denotes the sum rate of the SR transmitting BSSs. The TXOP owner may select SR BSSs based on the interference on the intended recipient STA(s).

Under the proposed scheme, information of space losses for each SR link may be necessary at the master AP in implementing the SR optimization algorithm. Referring to FIG. 15, scenario 1500 may involve AP1, AP2, STA1 and STA2. In scenario 1500, information of space losses for all SR links may involve the following: $PL_{AP1 \to STA1}$ and $PL_{AP2 \to STA1}$ at the receiver of STA1, and $PL_{AP1 \to STA2}$ and $PL_{AP2 \to STA2}$ at the receiver of STA2. Space losses may be derived from received power of trigger frames at the STA and AP TX power in the common field of the trigger frame. STA1 may report its measured space losses ($PL_{AP1 \to STA1}$ and $PL_{AP2 \to STA1}$) and its noise floor ($NF_{STA1}$) to AP1, and STA2 may report its measured space losses ($PL_{AP1 \to STA2}$ and $PL_{AP2 \to STA2}$) and its noise floor ($NF_{STA2}$) to AP2. AP2 may report all the above information to AP1 as the master AP. It is noteworthy that an alternate way for each STA to estimate the space loss may be to measure the received OBSS beacon power and report to its associated AP. The neighboring OBSS APs may transfer the noise floors of associated STAs, beacon TX powers of the AP, and received beacon power measured by STAs to the master AP.

Figure 16:
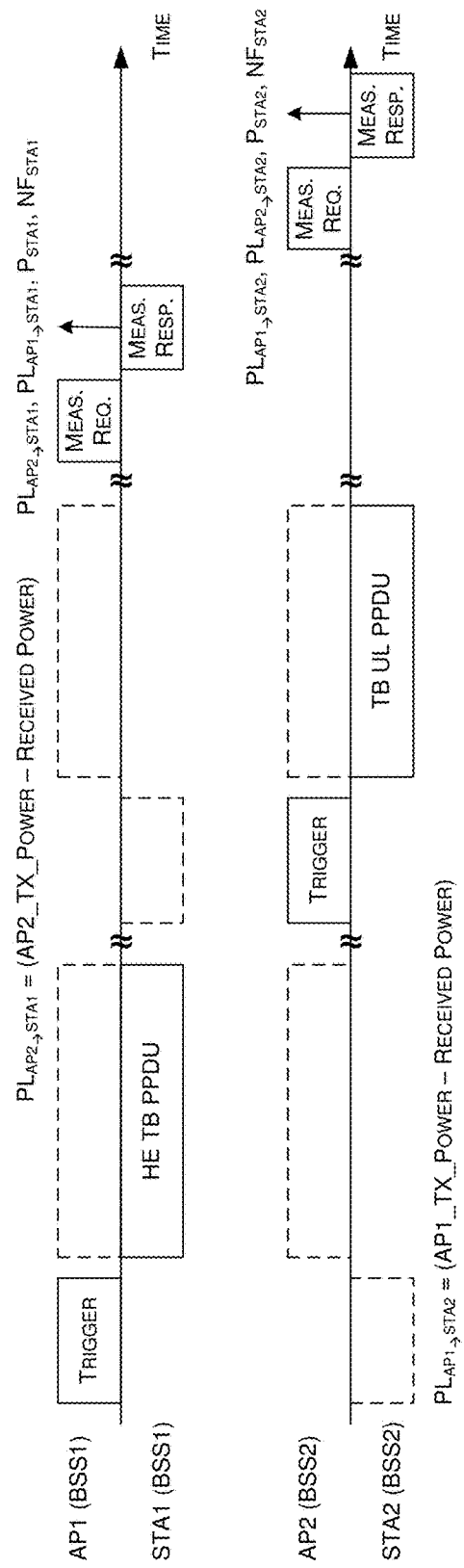
FIG. 16 is a diagram of an example scenario in accordance with an implementation of the present disclosure.

FIG. 16 illustrates an example scenario 1600 of phase 1 of DL SR in accordance with an implementation of the present disclosure. Under a proposed scheme in accordance with the present disclosure, each AP may request its associated STAs to perform SR measurements (e.g., path losses from its own AP and OBSS AP(s)) and report the measurements along with the noise floor of the STA. For instance, at step 1 (related to measurements), two options (e.g., option 1 and option 2) may be undertaken. In option 1, each AP may use a Measurement Request element to request its associated STAs to perform measurements of OBSS APs, and the STAs may report the OBSS AP measurements using a Beacon Report element. AP beacon TX power may also be needed to calculate the space loss. In option 2, the STAs may measure the received power from OBSS trigger frames and calculate the space loss based on AP TX power in the common field of the OFDMA trigger frame. At step 2 (related to reporting), each of the STAs may report the measured space losses and its noise floor to its associated AP.

Figure 17:
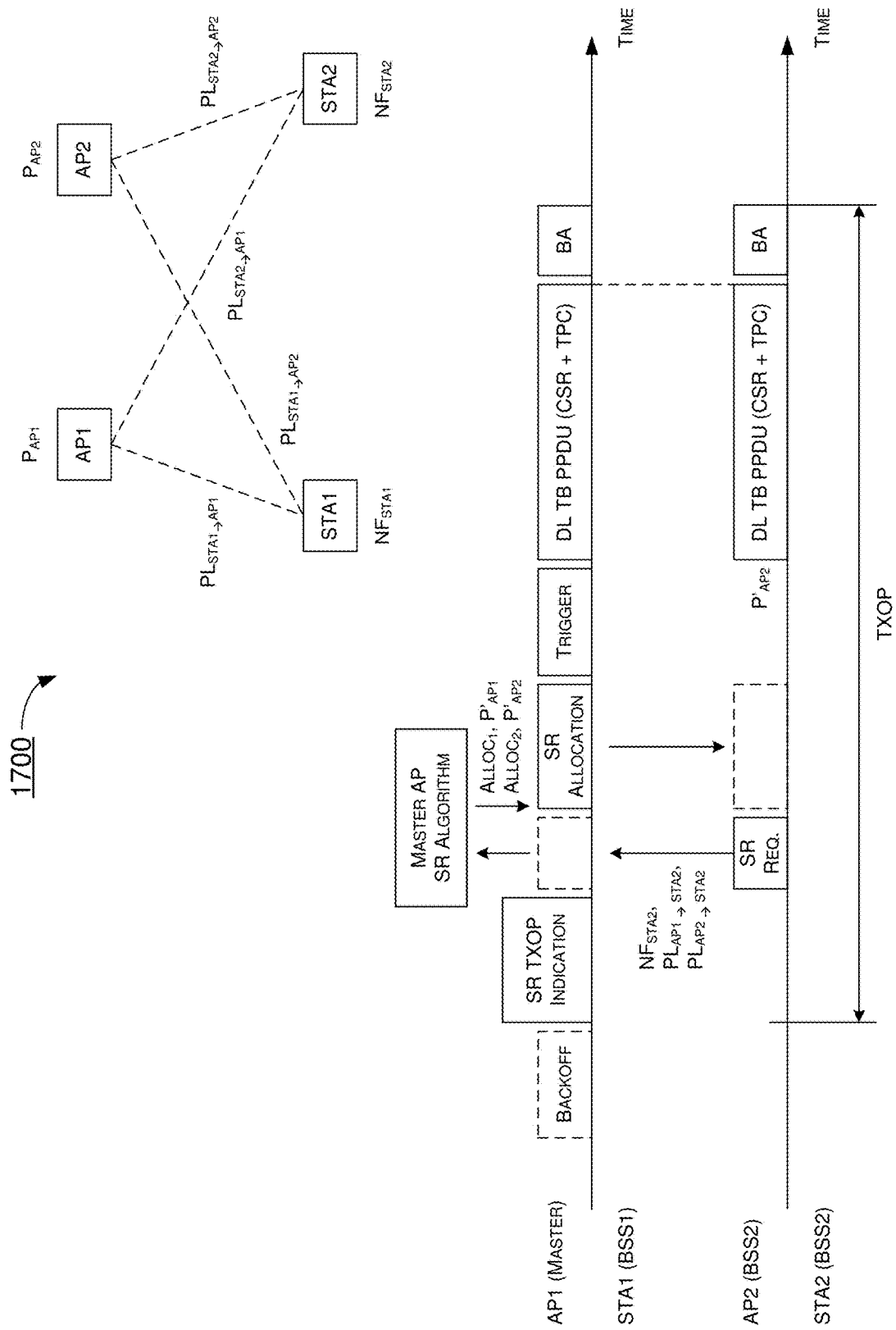
FIG. 17 is a diagram of an example scenario in accordance with an implementation of the present disclosure.
Figure 18:
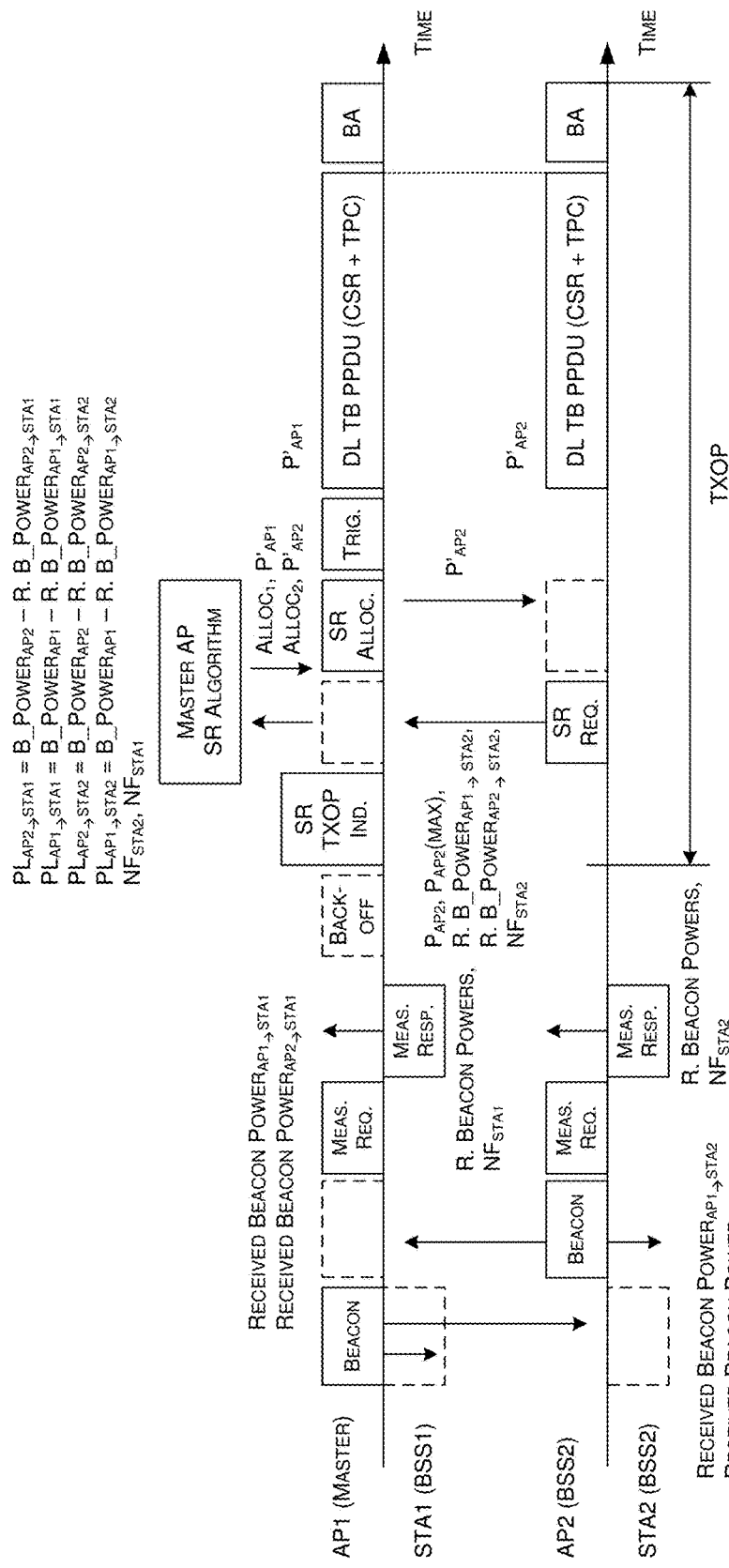
FIG. 18 is a diagram of an example scenario in accordance with an implementation of the present disclosure.

FIG. 17 illustrates an example scenario 1700 of phase 2 of DL SR in accordance with an implementation of the present disclosure. FIG. 18 illustrates an example scenario 1800 of an alternative method to derive space losses in accordance with an implementation of the present disclosure. Referring to FIG. 17 and FIG. 18, scenario 1700 and scenario 1800 may involve AP1, AP2, STA1 and STA2. Under a proposed scheme in accordance with the present disclosure, with respect to SR TXOP indication and request, the TXOP owner (e.g., AP1 as the master AP) may transmit an indication to inform selected neighboring AP(s) of an obtained SR TXOP. The neighboring AP(s) may be selected based on the measured report(s) from the intended recipient STA(s) of the TXOP owner. The selected neighboring AP(s) (e.g., AP2) may transmit a request to inform the TXOP owner (e.g., AP1) their intent to perform SR transmission and provide information such as $P_{STA2}(max)$, $PL_{AP2\text{-}STA2}$, $PL_{AP1 \to STA2}$, and $NF_{STA2}$. Alternatively, the received beacon powers and beacon TX power level may be provided. Under the proposed scheme, with respect to SR allocation, the TXOP owner may allocate the SR transmission schedule and the required TX power level, which may be calculated based on the maximum sum rate algorithm, to the selected neighboring AP(s). Moreover, with respect to SR transmission, the master AP may transmit a trigger frame, and APs participating in SR may perform SR DL transmission with TX power control.

Figure 19:
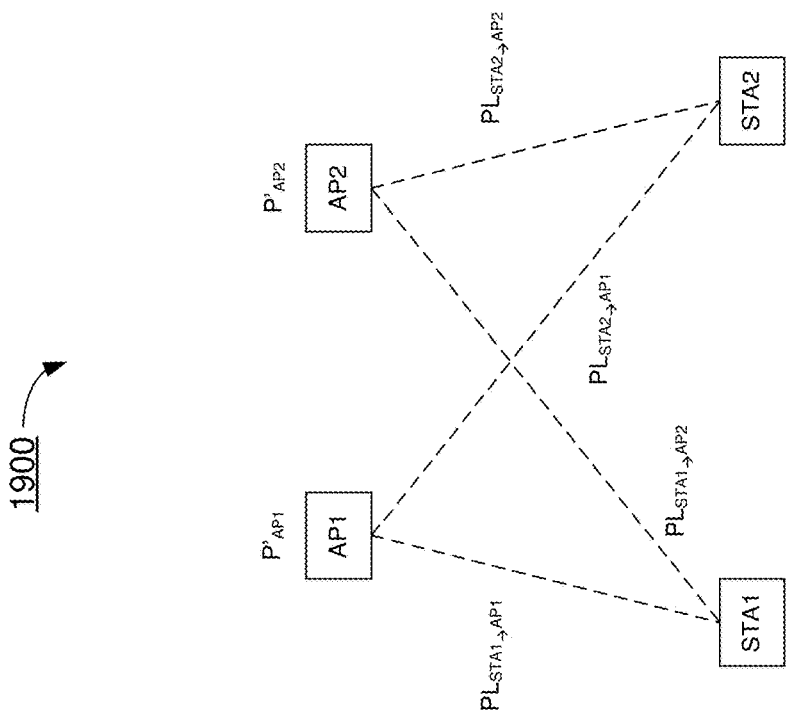
FIG. 19 is a diagram of an example scenario in accordance with an implementation of the present disclosure.

FIG. 19 illustrates an example scenario 1900 of DL SR in accordance with an implementation of the present disclosure. Under a proposed scheme in accordance with the present disclosure, the SR DL operation may be based on a criterion that OBSS interference with TX power control at the receiver is less than an acceptable interference threshold, as follows:

$$\text{OBSS Interference}_{\Delta TX\_PWR1, \Delta TX\_PWR2, \Delta TX\_PWR2, \ldots} < \text{Acceptable Interference Threshold}$$

Here, $\Delta TX\_PWR_1$, $\Delta TX\_PWR_2$, $\Delta TX\_PWR_3$ denote TX power adjustment of the DL transmitting STAs, and the acceptable interference thresholds may be set by configuration. The TXOP owner may select SR APs based on the interference on the intended recipient STA(s). It is noteworthy that the acceptable interference thresholds may be decided by the master AP based on the densification level or based on pre-determined values.

Under the proposed scheme, information of space losses for each SR link may be necessary at the master AP in implementing the SR optimization algorithm. Referring to FIG. 19, scenario 1900 may involve AP1, AP2, STA1 and STA2. In scenario 1900, information of space losses for all SR links may involve the following: $PL_{AP1 \rightarrow STA1}$ and $PL_{AP2 \rightarrow STA1}$ at the receiver of STA1, and $PL_{AP1 \rightarrow STA2}$ and $PL_{AP2 \rightarrow STA2}$ at the receiver of STA2. Space losses may be derived from received power of trigger frames at the STA and AP TX power in the common field of the trigger frame. STA1 may report its measured space losses ($PL_{AP1 \rightarrow STA1}$ and $PL_{AP2 \rightarrow STA1}$) to AP1, and STA2 may report its measured space losses ($PL_{AP1 \rightarrow STA2}$ and $PL_{AP2 \rightarrow STA2}$) to AP2. AP2 may report all the above information to AP1 as the master AP. It is noteworthy that an alternate way for each STA to estimate the space loss may be to measure the received OBSS beacon power and report to its associated AP. The neighboring OBSS APs may transfer the beacon TX powers of the AP and received beacon power measured by STAs to the master AP.

Figure 20:
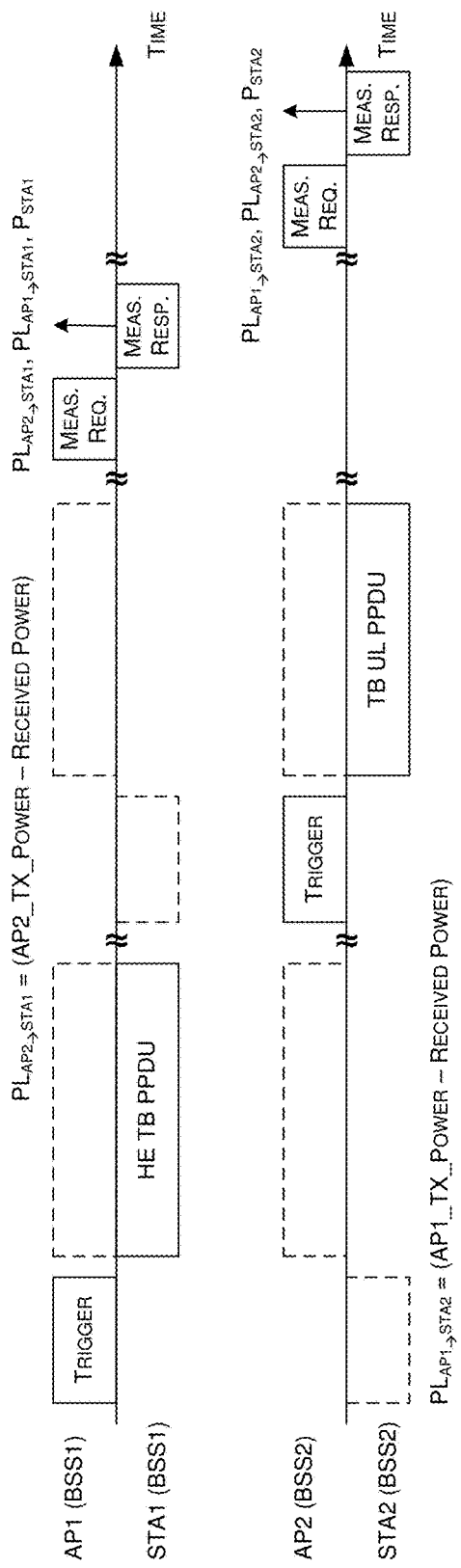
FIG. 20 is a diagram of an example scenario in accordance with an implementation of the present disclosure.

FIG. 20 illustrates an example scenario 2000 of phase 3 of DL SR in accordance with an implementation of the present disclosure. Under a proposed scheme in accordance with the present disclosure, each AP may request its associated STAs to perform SR measurements (e.g., path losses from its own AP and OBSS AP(s)) and report the measurements. For instance, at step 1 (related to measurements), two options (e.g., option 1 and option 2) may be undertaken. In option 1, each AP may use a Measurement Request element to request its associated STAs to perform measurements of OBSS APs, and the STAs may report the OBSS AP measurements using a Beacon Report element. In option 2, the STAs may measure the received power from OBSS trigger frames and calculate the space loss based on AP TX power in the common field of the OFDMA trigger frame. At step 2 (related to reporting), each of the STAs may report the measured space losses to its associated AP.

Figure 21:
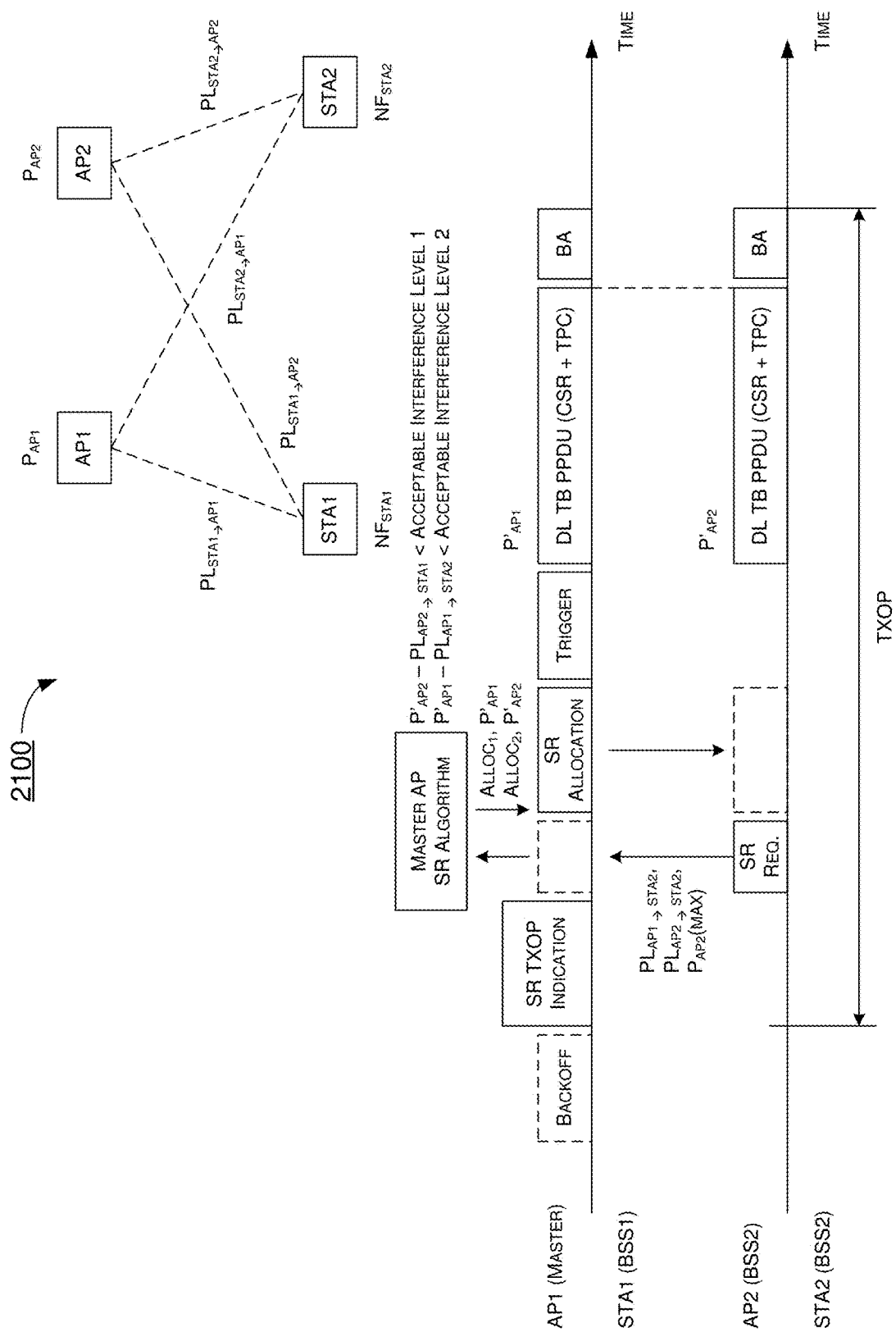
FIG. 21 is a diagram of an example scenario in accordance with an implementation of the present disclosure.
Figure 22:
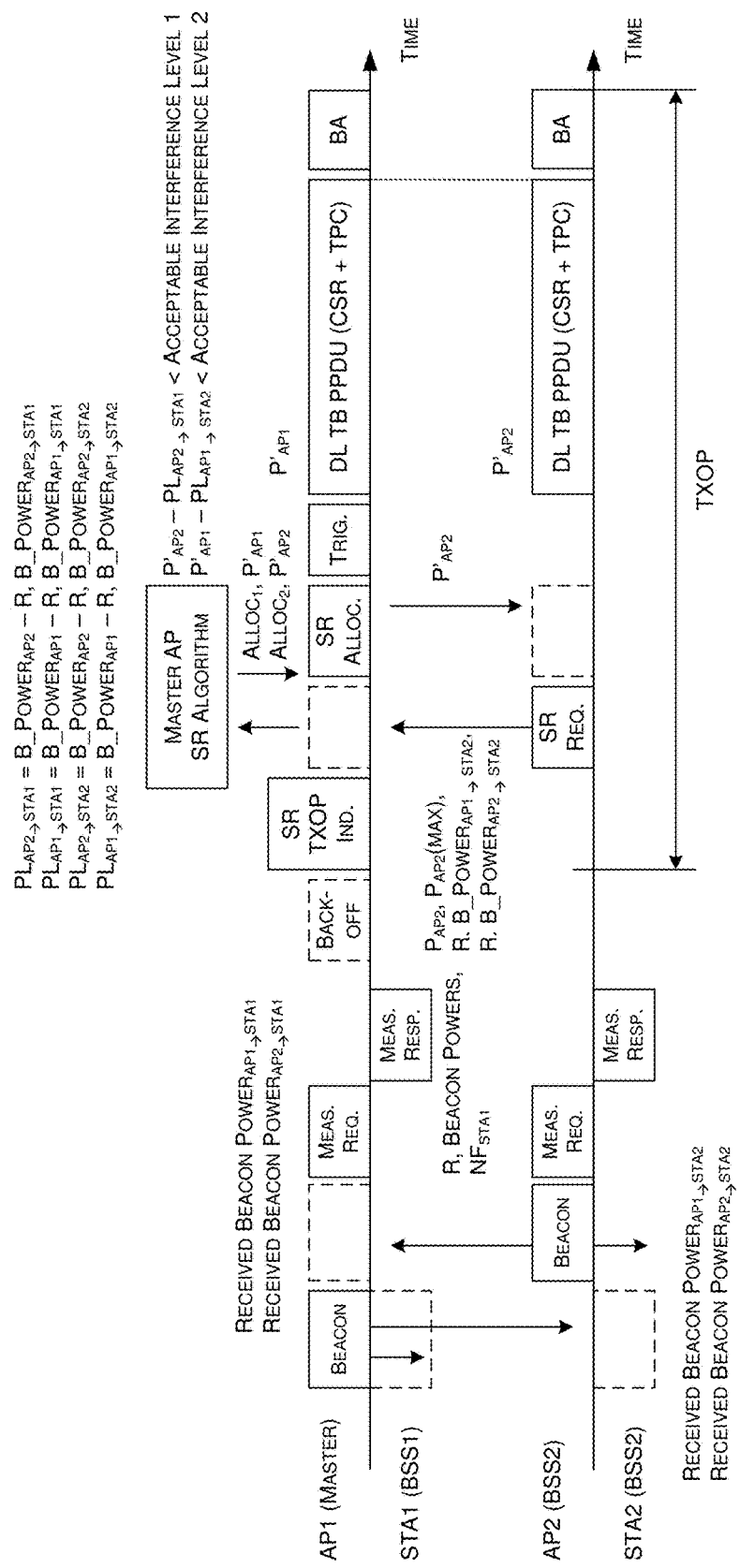
FIG. 22 is a diagram of an example scenario in accordance with an implementation of the present disclosure.

FIG. 21 illustrates an example scenario 2100 of phase 2 of DL SR in accordance with an implementation of the present disclosure. FIG. 22 illustrates an example scenario 2200 of an alternative method to derive space losses in accordance with an implementation of the present disclosure. Referring to FIG. 21 and FIG. 22, scenario 2100 and scenario 2200 may involve AP1, AP2, STA1 and STA2. Under a proposed scheme in accordance with the present disclosure, with respect to SR TXOP indication and request, the TXOP owner (e.g., AP1 as the master AP) may transmit an indication to inform selected neighboring AP(s) of an obtained SR TXOP. The neighboring AP(s) may be selected based on the measured report(s) from the intended recipient STA(s) of the TXOP owner. The selected neighboring AP(s) (e.g., AP2) may transmit a request to inform the TXOP owner (e.g., AP1) their intent to perform SR transmission and provide information such as space losses to its intended recipient STA(s). Alternatively, the received beacon powers and beacon TX power level may be provided. Under the proposed scheme, with respect to SR allocation, the TXOP owner may determine the TX power levels of all SR links (so as to achieve optimization criteria) and allocate the SR transmission schedule and the required TX power level to the selected neighboring AP(s). Moreover, with respect to SR transmission, the master AP may transmit a trigger frame, and APs participating in SR may perform SR DL transmission with TX power control.

Figure 23:
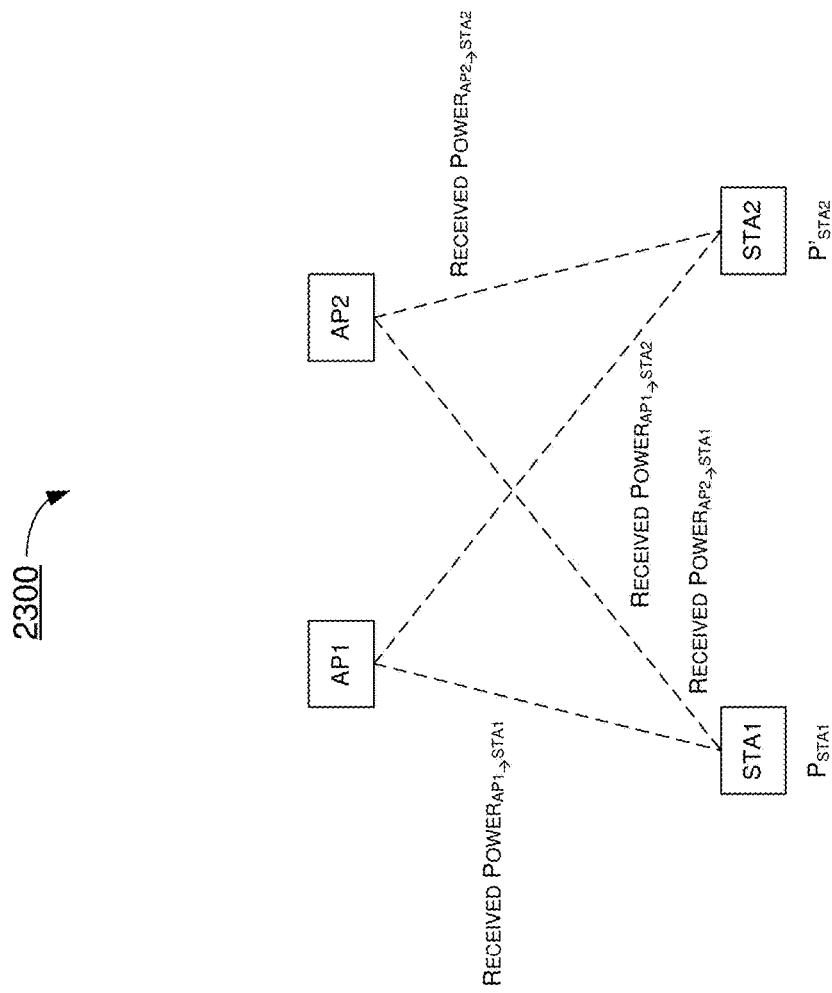
FIG. 23 is a diagram of an example scenario in accordance with an implementation of the present disclosure.

FIG. 23 illustrates an example scenario 2300 of UL SR in accordance with an implementation of the present disclosure. Under a proposed scheme in accordance with the present disclosure, the SR UL operation may be based on a criterion that OBSS interference with TX power control at the receiver is less than an acceptable interference threshold, as follows:

OBSS Interference$_{\Delta TX\_PWR1, \Delta TX\_PWR2, \Delta TX\_PWR2 \ldots}$
<Acceptable Interference Threshold Here, $\Delta TX\_PWR_1$, $\Delta TX\_PWR_2$, $\Delta TX\_PWR_3$ denote TX power adjustment of the DL transmitting STAs, and the acceptable interference thresholds may be set by configuration. The TXOP owner may select SR BSSs based on the interference on the intended recipient STA(s). It is noteworthy that the acceptable interference thresholds may be decided by the master AP based on the densification level or based on pre-determined values.

Under the proposed scheme, in order to implement the SR optimization algorithm, certain operations may need to be performed. Referring to FIG. 23, scenario 2300 may involve AP1, AP2, STA1 and STA2. In scenario 2300, STA1 and STA2 may measure the OBSS AP received power. Moreover, the SRP of AP1 (SRP1) may be provided to STAs in BSS2. It is noteworthy that STAs in BSS1, which is associated with AP1 the master AP, would not need power control for OBSS.

Figure 24:
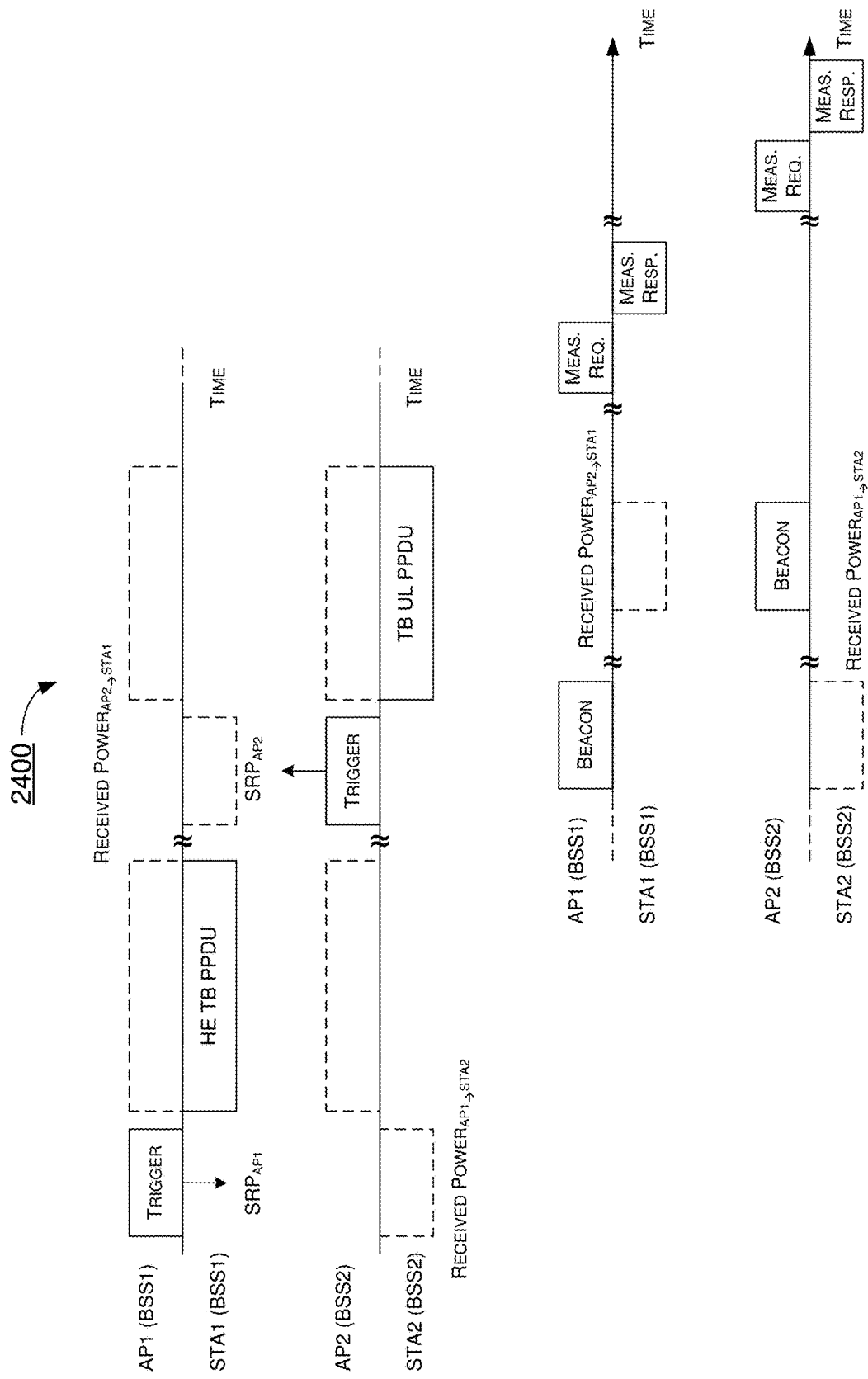
FIG. 24 is a diagram of an example scenario in accordance with an implementation of the present disclosure.

FIG. 24 illustrates an example scenario 2400 of phase 1 of UL SR in accordance with an implementation of the present disclosure. Under a proposed scheme in accordance with the present disclosure, each AP may request its associated STAs to perform SR measurements (e.g., path losses from its own AP and OBSS AP(s)) and report the measurements. For instance, each AP may use a Measurement Request element to request its associated STAs to perform measurements of OBSS APs, and the STAs may report the OBSS AP measurements using a Beacon Report element. Alternatively, the STAs may measure the received power from one or more OBSS PPDUs.

Figure 25:
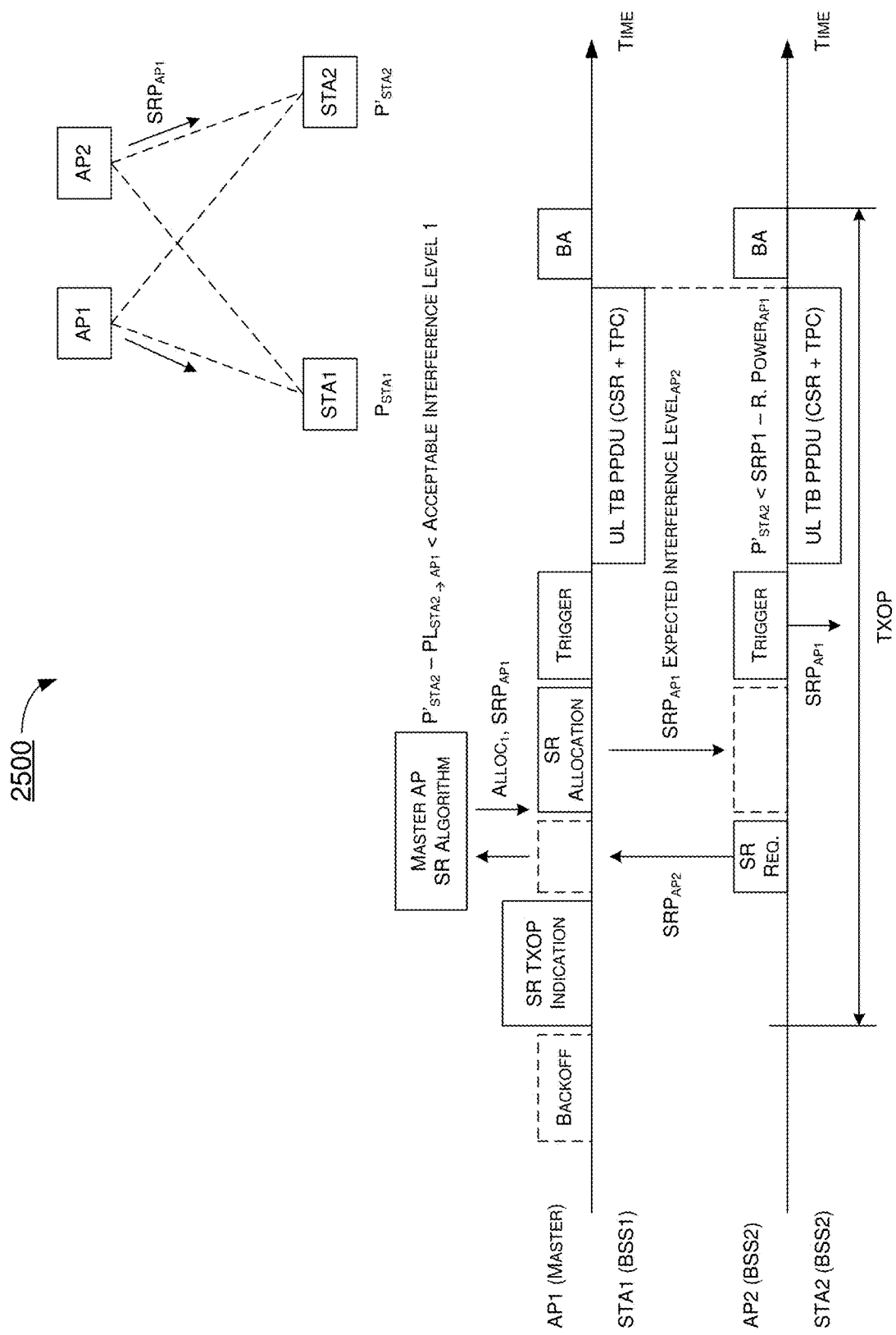
FIG. 25 is a diagram of an example scenario in accordance with an implementation of the present disclosure.

FIG. 25 illustrates an example scenario 2500 of phase 2 of UL SR in accordance with an implementation of the present disclosure. Referring to FIG. 25, scenario 2200 may involve AP1, AP2, STA1 and STA2. Under a proposed scheme in accordance with the present disclosure, with respect to SR TXOP indication and request, the TXOP owner (e.g., AP1 as the master AP) may transmit an indication to inform selected neighboring AP(s) of an obtained SR TXOP. The selected neighboring AP(s) (e.g., AP2) may transmit a request to inform the TXOP owner (e.g., AP1) their intent to participate in an SR transmission. Under the proposed scheme, with respect to SR allocation, the TXOP owner may allocate the SR transmission schedule and transfer the SRP of AP1 (SRP1) to the selected neighboring AP(s). Moreover, with respect to SR transmission, APs participating in SR may transmit a trigger frame (with SRP1). Additionally, STAs participating in SR UL transmission may perform UL transmission with TX power control to avoid exceeding an interference level determined based on SRPs (e.g., $P'_{STA2}$<SRP1-R. Power$_{AP1}$). It is noteworthy that in case more APs are participating in SR transmission, SRP of AP2 (SRP2), SRP of AP3 (SRP3) and SRPs of other participating APs may be used to restrict mutual interference.

Illustrative Implementations

Figure 26:
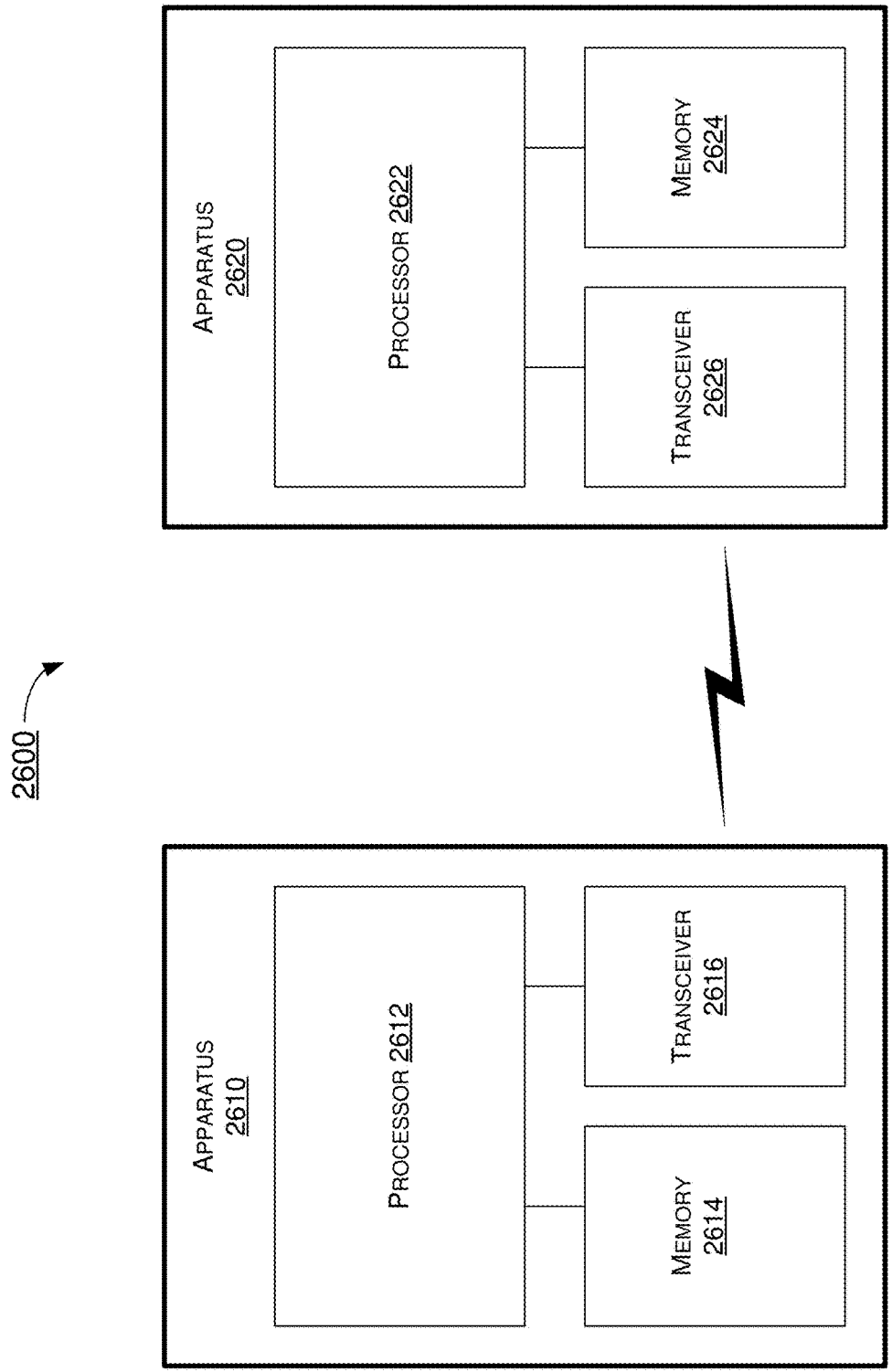
FIG. 26 is a block diagram of an example communication system in accordance with an implementation of the present disclosure.

FIG. 26 illustrates an example system 2600 having at least an example apparatus 2610 and an example apparatus 2620 in accordance with an implementation of the present disclosure. Each of apparatus 2610 and apparatus 2620 may perform various functions to implement schemes, techniques, processes and methods described herein pertaining to multi-AP CSR protocols and algorithms in wireless communications, including the various schemes described above with respect to various proposed designs, concepts, schemes, systems and methods described above as well as processes described below. For instance, apparatus 2610 may be implemented in one of APs 120(1)~120(M) and apparatus 2620 may be implemented in one of APs 120(1) ~120(M) or one of STAs 110(1)~110(N), or vice versa.

Each of apparatus 2610 and apparatus 2620 may be a part of an electronic apparatus, which may be a STA or an AP, such as a portable or mobile apparatus, a wearable apparatus, a wireless communication apparatus or a computing apparatus. When implemented in a STA, each of apparatus 2610 and apparatus 2620 may be implemented in a smartphone, a smart watch, a personal digital assistant, a digital camera, or a computing equipment such as a tablet computer, a laptop computer or a notebook computer. Each of apparatus 2610 and apparatus 2620 may also be a part of a machine type apparatus, which may be an IoT apparatus such as an immobile or a stationary apparatus, a home apparatus, a wire communication apparatus or a computing apparatus. For instance, each of apparatus 2610 and apparatus 2620 may be implemented in a smart thermostat, a smart fridge, a smart door lock, a wireless speaker or a home control center. When implemented in or as a network apparatus, apparatus 2610 and/or apparatus 2620 may be implemented in a network node, such as an AP in a WLAN.

In some implementations, each of apparatus 2610 and apparatus 2620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2610 and apparatus 2620 may be implemented in or as a STA or an AP. Each of apparatus 2610 and apparatus 2620 may include at least some of those components shown in FIG. 26 such as a processor 2612 and a processor 2622, respectively, for example. Each of apparatus 2610 and apparatus 2620 may further include one or more other components not pertinent to the proposed scheme of the present disclosure (e.g., internal power supply, display device and/or user interface device), and, thus, such component(s) of apparatus 2610 and apparatus 2620 are neither shown in FIG. 26 nor described below in the interest of simplicity and brevity.

In one aspect, each of processor 2612 and processor 2622 may be implemented in the form of one or more single-core processors, one or more multi-core processors, one or more RISC processors or one or more CISC processors. That is, even though a singular term "a processor" is used herein to refer to processor 2612 and processor 2622, each of processor 2612 and processor 2622 may include multiple processors in some implementations and a single processor in other implementations in accordance with the present disclosure. In another aspect, each of processor 2612 and processor 2622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2612 and processor 2622 is a special-purpose machine specifically designed, arranged and configured to perform specific tasks including those pertaining to multi-AP CSR protocols and algorithms in wireless communications in accordance with various implementations of the present disclosure.

In some implementations, apparatus 2610 may also include a transceiver 2616 coupled to processor 2612. Transceiver 2616 may include a transmitter capable of wirelessly transmitting and a receiver capable of wirelessly receiving data. In some implementations, apparatus 2620 may also include a transceiver 2626 coupled to processor 2622. Transceiver 2626 may include a transmitter capable of wirelessly transmitting and a receiver capable of wirelessly receiving data. It is noteworthy that, although transceiver 2616 and transceiver 2626 are illustrated as being external to and separate from processor 2612 and processor 2622, respectively, in some implementations, transceiver 2616 may be an integral part of processor 2612 as a system on chip (SoC) and/or transceiver 2626 may be an integral part of processor 2622 as an SoC.

In some implementations, apparatus 2610 may further include a memory 2614 coupled to processor 2612 and capable of being accessed by processor 2612 and storing data therein. In some implementations, apparatus 2620 may further include a memory 2624 coupled to processor 2622 and capable of being accessed by processor 2622 and storing data therein. Each of memory 2614 and memory 2624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2614 and memory 2624 may include a type of read-only memory (ROM) such as mask ROM, programmable ROM (PROM), erasable programmable ROM (EPROM) and/or electrically erasable programmable ROM (EEPROM). Alternatively, or additionally, each of memory 2614 and memory 2624 may include a type of non-volatile random-access memory (NVRAM) such as flash memory, solid-state memory, ferroelectric RAM (FeRAM), magnetoresistive RAM (MRAM) and/or phase-change memory.

Each of apparatus 2610 and apparatus 2620 may be a communication entity capable of communicating with each other using various proposed schemes in accordance with the present disclosure. For illustrative purposes and without limitation, a description of capabilities of apparatus 2610, as STA 110, and apparatus 2620, as AP 120, is provided below. It is noteworthy that, although a detailed description of capabilities, functionalities and/or technical features of apparatus 2610 is provided below, the same may be applied to apparatus 2620 although a detailed description thereof is not provided solely in the interest of brevity. It is also noteworthy that, although the example implementations described below are provided in the context of WLAN, the same may be implemented in other types of networks.

Under a proposed scheme pertaining to multi-AP CSR protocols and algorithms in wireless communications in accordance with the present disclosure, with apparatus 2610 implemented in or as a master AP (e.g., AP 120(1)) and apparatus 2620 implemented in or as a slave AP (e.g., AP 120(M)) or a STA (e.g., one of STAs 110(1)~110(N)) of a wireless network such as a WLAN in network environment 100 in accordance with one or more of IEEE 802.11 standards, processor 2612 of apparatus 2610 may select, via transceiver 2616, at least one BSS from one or more neighbor BSSs to form an SRG. Moreover, processor 2612 of apparatus 2610 may perform, via transceiver 2616, CSR in the SRG with a set of OBSS PD parameters.

In some implementations, in selecting the at least one BSS, processor 2612 may perform certain operations. For instance, processor 2612 may determine an interference level of each of the one or more neighbor BSSs. Additionally, processor 2612 may select at least one of the one or more neighbor BSSs having a lowest interference level detected by the apparatus among the one or more neighbor BSSs.

In some implementations, in determining the interference level of each of the one or more neighbor BSSs, processor 2612 may monitor a power level of one or more signals received from each of the one or more neighbor BSSs. Alternatively, in determining the interference level of each of the one or more neighbor BSSs, processor 2612 may perform other operations. For instance, processor 2612 may request one or more STAs associated with the master AP to report received power levels of a list of one or more coordinated APs. Moreover, processor 2612 may receive a report from each of the one or more STAs associated with the master AP on the received power levels of the list of one or more coordinated APs responsive to the requesting. In some implementations, the report may further include a TX power, receiver sensitivity, an SRP, or a combination thereof received from the list of one or more coordinated APs.

In some implementations, in performing the CSR, processor 2612 may perform certain operations. For instance, processor 2612 may transmit, to a coordinated AP associated with each of the selected at least one BSS, a list of one or more excluded STAs which would suffer high interference from DL transmissions by the master AP. Additionally, processor 2612 may select at least one STA not in the list of one or more excluded STAs. Moreover processor 2612 may perform a DL transmission to the selected at least one STA as part of joint DL SR transmissions in conjunction with the coordinated AP associated with each of the selected at least one BSS.

In some implementations, in performing the CSR, processor 2612 may perform certain operations. For instance, processor 2612 may inform a coordinated AP associated with each of the selected at least one BSS of an available BW. Additionally, processor 2612 may receive a request for at least a portion of the available BW from the coordinated AP associated with each of the selected at least one BSS. Moreover, processor 2612 may transmit a grant of some or all of the available bandwidth to the coordinated AP associated with each of the selected at least one BSS. Furthermore, processor 2612 may perform joint SR transmissions with OFDMA in conjunction with the coordinated AP associated with each of the selected at least one BSS.

In some implementations, in performing the CSR, processor 2612 may perform certain operations. For instance, processor 2612 may inform a coordinated AP associated with each of the selected at least one BSS for joint CSR UL transmissions with receiver interference cancellation. Additionally, processor 2612 may transmit an UL trigger to at least one STA associated with the master AP. Moreover, processor 2612 may receive a triggered UL transmission from the at least one STA during a period of time in which the coordinated AP receives a triggered UL transmission from at least one STA associated with each of the selected at least one BSS. In such cases, a number of the at least one STA performing the triggered UL transmission in each of the selected at least one BSS may be limited by the number of antennas at the master AP. In some implementations, in performing the CSR, processor 2612 may perform additional operations. For instance, processor 2612 may determine spatial dimensions for receiving the UL transmission and nulling an interference from each of the selected at least one BSS. Furthermore, processor 2612 may cancel the interference from each of the selected at least one BSS with CBF using unique orthogonal vectors carried in one or more LTFs received from the at least one STA.

In some implementations, processor 2612 may further determine the set of OBSS PD parameters that is associated with high path losses higher than a threshold to achieve high SR gain within the SRG.

Under another proposed scheme pertaining to multi-AP CSR protocols and algorithms in wireless communications in accordance with the present disclosure, with apparatus 2610 implemented in or as a master AP (e.g., AP 120(1)) and apparatus 2620 implemented in or as a slave AP (e.g., AP 120(M)) or a STA (e.g., one of STAs 110(1)~110(N)) of a wireless network such as a WLAN in network environment 100 in accordance with one or more of IEEE 802.11 standards, processor 2612 of apparatus 2610 may receive, via transceiver 2616, a report on received power levels of one or more coordinated APs from each of one or more STAs associated with the master AP. Additionally, processor 2612 of apparatus 2610 may select, via transceiver 2616, at least one STA of the one or more STAs based on the report received from each of the one or more STAs. Moreover, processor 2612 of apparatus 2610 may select, via transceiver 2616, a coordinated AP from the one or more coordinated APs. Furthermore, processor 2612 of apparatus 2610 may perform, via transceiver 2616, CSR transmissions in conjunction with the at least one coordinated AP.

In some implementations, the report may further include a TX power, receiver sensitivity, an SRP, or a combination thereof received from the one or more coordinated APs.

In some implementations, in selecting the coordinated AP, processor 2612 may select at least one of the one or more coordinated APs causing a lowest interference level among the one or more coordinated APs as detected by the one or more STAs based on the report received from each of the one or more STAs.

In some implementations, in performing the CSR transmissions, processor 2612 may perform coordinated UL transmissions by performing certain operations. For instance, processor 2612 may transmit, to the coordinated AP, a list of one or more excluded STAs which would cause high interference to the master AP. Additionally, processor 2612 may select the at least one STA. Moreover, processor 2612 may transmit an UL trigger to the at least one STA. Furthermore, processor 2612 may receive a triggered UL transmission from the at least one STA during a period of time in which the coordinate AP receives an UL transmission from at least one STA associated with the coordinated AP.

In some implementations, in performing the CSR transmissions, processor 2612 may further inform the coordinated AP about an SR opportunity and an SRP of the master AP. In some implementations, an acceptable interference level in the SRP may be adjustable by the master AP as a tradeoff between interference and throughput for a coordinated BSS associated with the coordinated AP. Moreover, the SRP of the master AP may be used in TX power control by each triggered STA in the coordinated BSS.

In some implementations, processor 2612 may further measure an interference level of each of the one or more coordinated APs. In such cases, in selecting the coordinated AP, processor 2612 may select one of the one or more coordinated APs having a lowest interference level measured by the apparatus among the one or more coordinated APs.

In some implementations, in performing the CSR transmissions, processor 2612 may perform certain operations. For instance, processor 2612 may transmit an UL trigger to the at least one STA. Additionally, processor 2612 may receive a triggered UL transmission from the at least one STA during a period of time in which the coordinate AP performs a DL transmission to at least one STA associated with the coordinated AP.

In some implementations, processor 2612 may further measure an interference level of each of the one or more coordinated APs. In such cases, in selecting the coordinated AP, processor 2612 may select one of the one or more coordinated APs having a measured lowest interference level measured by the apparatus among the one or more coordinated APs as well as a reported lowest interference level among the one or more coordinated APs based on a respective report received from the at least one STA. In some implementations, in performing the CSR transmissions, processor 2612 may perform a DL transmission to the at least one STA during a period of time in which the coordinated AP transmits an UL trigger to, and receives an UL transmission from, at least one STA associated with the coordinated AP.

Illustrative Processes

Figure 27:
FIG. 27 is a flowchart of an example process in accordance with an implementation of the present disclosure.

FIG. 27 illustrates an example process 2700 in accordance with an implementation of the present disclosure. Process 2700 may represent an aspect of implementing various proposed designs, concepts, schemes, systems and methods described above. More specifically, process 2700 may represent an aspect of the proposed concepts and schemes pertaining to multi-AP CSR protocols and algorithms in wireless communications in accordance with the present disclosure. Process 2700 may include one or more operations, actions, or functions as illustrated by one or more of blocks 2710 and 2720. Although illustrated as discrete blocks, various blocks of process 2700 may be divided into additional blocks, combined into fewer blocks, or eliminated, depending on the desired implementation. Moreover, the blocks/sub-blocks of process 2700 may be executed in the order shown in FIG. 27 or, alternatively in a different order. Furthermore, one or more of the blocks/sub-blocks of process 2700 may be executed repeatedly or iteratively. Process 2700 may be implemented by or in apparatus 2610 and apparatus 2620 as well as any variations thereof. Process 2700 may begin at block 2710.

At 2710, process 2700 may involve selecting at least one BSS from one or more neighbor BSSs to form an SRG. Process 2700 may proceed from 2710 to 2720.

At 2720, process 2700 may involve performing CSR in the SRG with a set of OBSS PD parameters.

In some implementations, in selecting the at least one BSS, process 2700 may involve performing certain operations. For instance, process 2700 may involve determining an interference level of each of the one or more neighbor BSSs. Additionally, process 2700 may involve selecting at least one of the one or more neighbor BSSs having a lowest interference level detected by the apparatus among the one or more neighbor BSSs.

In some implementations, in determining the interference level of each of the one or more neighbor BSSs, process 2700 may involve monitoring a power level of one or more signals received from each of the one or more neighbor BSSs. Alternatively, in determining the interference level of each of the one or more neighbor BSSs, process 2700 may involve performing other operations. For instance, process 2700 may involve requesting one or more STAs associated with a master AP to report received power levels of a list of one or more coordinated APs. Moreover, process 2700 may involve receiving a report from each of the one or more STAs associated with the master AP on the received power levels of the list of one or more coordinated APs responsive to the requesting. In some implementations, the report may further include a TX power, receiver sensitivity, an SRP, or a combination thereof received from the list of one or more coordinated APs.

In some implementations, in performing the CSR, process 2700 may involve performing certain operations. For instance, process 2700 may involve transmitting, to a coordinated AP associated with each of the selected at least one BSS, a list of one or more excluded STAs which would suffer high interference from DL transmissions by the master AP. Additionally, process 2700 may involve selecting at least one STA not in the list of one or more excluded STAs. Moreover, process 2700 may involve performing a DL transmission to the selected at least one STA as part of joint DL SR transmissions in conjunction with the coordinated AP associated with each of the selected at least one BSS.

In some implementations, in performing the CSR, process 2700 may involve performing certain operations. For instance, process 2700 may involve informing a coordinated AP associated with each of the selected at least one BSS of an available BW. Additionally, process 2700 may involve receiving a request for at least a portion of the available BW from the coordinated AP associated with each of the selected at least one BSS. Moreover, process 2700 may involve transmitting a grant of some or all of the available bandwidth to the coordinated AP associated with each of the selected at least one BSS. Furthermore, process 2700 may involve performing joint SR transmissions with OFDMA in conjunction with the coordinated AP associated with each of the selected at least one BSS.

In some implementations, in performing the CSR, process 2700 may involve performing certain operations. For instance, process 2700 may involve informing one or more coordinated APs associated with each of the selected at least one BSS for joint CSR UL transmissions with receiver interference cancellation. Additionally, process 2700 may involve transmitting an UL trigger to at least one STA associated with a master AP. Moreover, process 2700 may involve receiving a triggered UL transmission from the at least one STA during a period of time in which the coordinated AP receives a triggered UL transmission from at least one STA associated with each of the selected at least one BSS. In such cases, a number of the at least one STA performing the triggered UL transmission in each of the selected at least one BSS may be limited by a number of antennas at the master AP. In some implementations, in performing the CSR, process 2700 may involve processor 2612 performing additional operations. For instance, process 2700 may involve determining spatial dimensions for receiving the UL transmission and nulling an interference from each of the selected at least one BSS. Furthermore, process 2700 may involve cancelling the interference from each of the selected at least one BSS with CBF using unique orthogonal vectors carried in one or more LTFs received from the at least one STA.

In some implementations, process 2700 may further involve determining the set of OBSS PD parameters that is associated with high path losses higher than a threshold to achieve high SR gain within the SRG.

Figure 28:
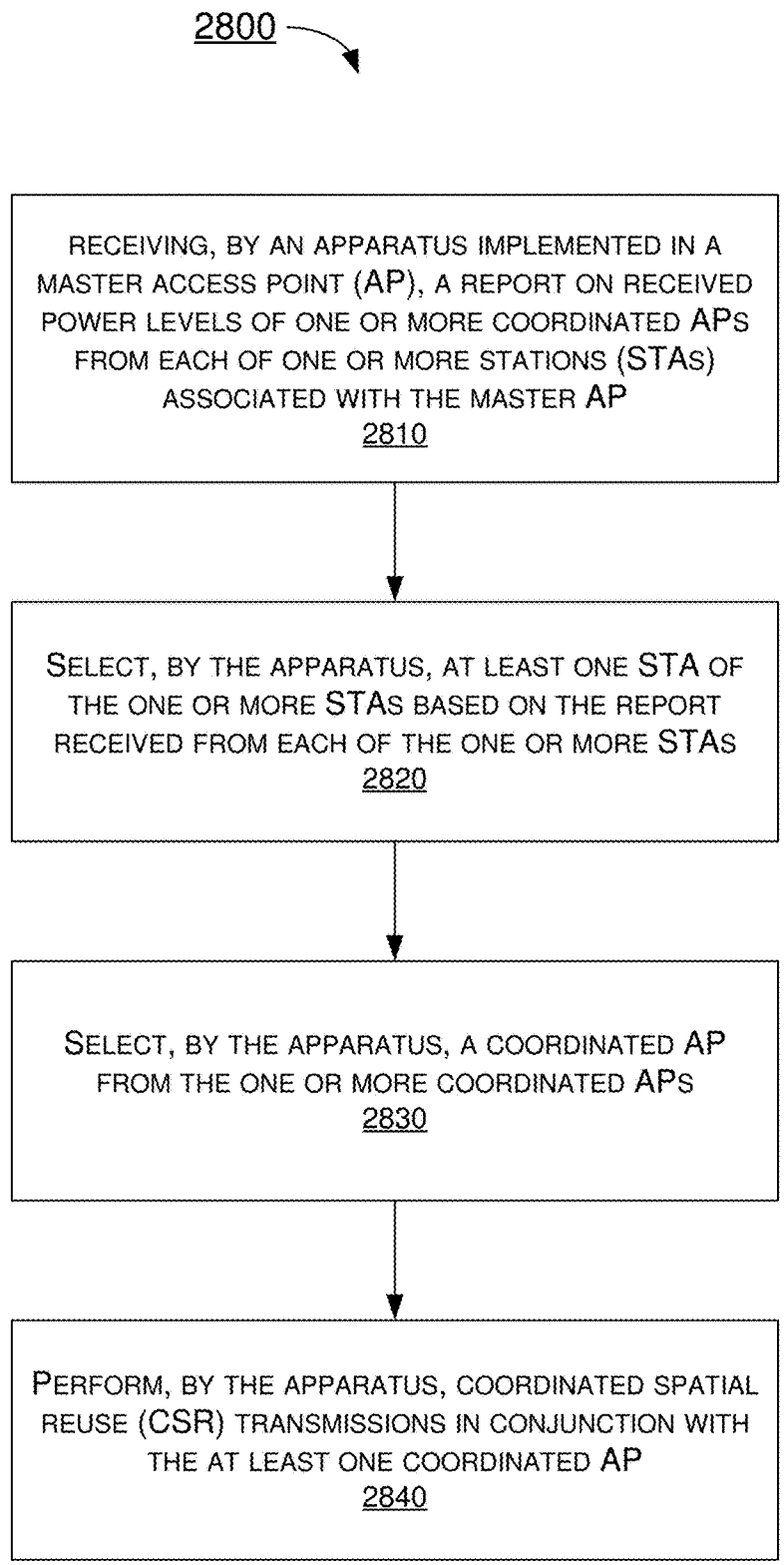
FIG. 28 is a flowchart of an example process in accordance with an implementation of the present disclosure.

FIG. 28 illustrates an example process 2800 in accordance with an implementation of the present disclosure. Process 2800 may represent an aspect of implementing various proposed designs, concepts, schemes, systems and methods described above. More specifically, process 2800 may represent an aspect of the proposed concepts and schemes pertaining to multi-AP CSR protocols and algorithms in wireless communications in accordance with the present disclosure. Process 2800 may include one or more operations, actions, or functions as illustrated by one or more of blocks 2810, 2820, 2830 and 2840. Although illustrated as discrete blocks, various blocks of process 2800 may be divided into additional blocks, combined into fewer blocks, or eliminated, depending on the desired implementation. Moreover, the blocks/sub-blocks of process 2800 may be executed in the order shown in FIG. 28 or, alternatively in a different order. Furthermore, one or more of the blocks/sub-blocks of process 2800 may be executed repeatedly or iteratively. Process 2800 may be implemented by or in apparatus 2610 and apparatus 2620 as well as any variations thereof. Solely for illustrative purposes and without limiting the scope, process 2800 is described below in the context of apparatus 2610 implemented in or as one of STAs 110(1)~110(N) (e.g., STA 110(1)) and apparatus 2620 implemented in or as one of APs 120(1)~120(M) (e.g., AP 120(1)) of a wireless network such as a WLAN in network environment 100 in accordance with one or more of IEEE 802.11 standards. Process 2800 may begin at block 2810.

At 2810, process 2800 may involve processor 2612 of apparatus 2610, implemented in a master AP (e.g., AP 120(1)), receiving, via transceiver 2616, a report on received power levels of one or more coordinated APs from each of one or more STAs associated with the master AP. Process 2800 may proceed from 2810 to 2820.

At 2820, process 2800 may involve processor 2612 of apparatus 2610 selecting, via transceiver 2616, at least one STA of the one or more STAs based on the report received from each of the one or more STAs. Process 2800 may proceed from 2820 to 2830.

At 2830, process 2800 may involve processor 2612 of apparatus 2610 selecting, via transceiver 2616, a coordinated AP from the one or more coordinated APs. Process 2800 may proceed from 2830 to 2840.

At 2840, process 2800 may involve processor 2612 of apparatus 2610 performing, via transceiver 2616, CSR transmissions in conjunction with the at least one coordinated AP.

In some implementations, the report may further include a TX power, receiver sensitivity, an SRP, or a combination thereof received from the one or more coordinated APs.

In some implementations, in selecting the coordinated AP, process 2800 may involve processor 2612 selecting at least one of the one or more coordinated APs causing a lowest interference level among the one or more coordinated APs as detected by the one or more STAs based on the report received from each of the one or more STAs.

In some implementations, in performing the CSR transmissions, process 2800 may involve processor 2612 performing coordinated UL transmissions by performing certain operations. For instance, process 2800 may involve processor 2612 transmitting, to the coordinated AP, a list of one or more excluded STAs which would cause high interference to the master AP. Moreover, process 2800 may involve processor 2612 transmitting an UL trigger to at least one STA. Furthermore, process 2800 may involve processor 2612 receiving a triggered UL transmission from the at least one STA during a period of time in which the coordinated AP receives an UL transmission from at least one STA associated with the coordinated AP.

In some implementations, in performing the CSR transmissions, process 2800 may further involve processor 2612 informing the coordinated AP about an SR opportunity and an SRP of the master AP. In some implementations, an acceptable interference level in the SRP may be adjustable by the master AP as a tradeoff between interference and throughput for a coordinated BSS associated with the coordinated AP. Moreover, the SRP of the master AP may be used in TX power control by each triggered STA in the coordinated BSS.

In some implementations, process 2800 may further involve processor 2612 measuring an interference level of each of the one or more coordinated APs. In such cases, in selecting the coordinated AP, process 2800 may involve processor 2612 selecting one of the one or more coordinated APs having a lowest interference level measured by the apparatus among the one or more coordinated APs.

In some implementations, in performing the CSR transmissions, process 2800 may involve processor 2612 performing certain operations. For instance, process 2800 may involve processor 2612 transmitting an UL trigger to the at least one STA. Additionally, process 2800 may involve processor 2612 receiving a triggered UL transmission from the at least one STA during a period of time in which the coordinate AP performs a DL transmission to at least one STA associated with the coordinated AP.

In some implementations, process 2800 may further involve processor 2612 measuring an interference level of each of the one or more coordinated APs. In such cases, in selecting the coordinated AP, process 2800 may involve processor 2612 selecting one of the one or more coordinated APs having a measured lowest interference level measured by the apparatus among the one or more coordinated APs as well as a reported lowest interference level among the one or more coordinated APs based on a respective report received from the at least one STA. In some implementations, in performing the CSR transmissions, process 2800 may involve processor 2612 performing a DL transmission to the at least one STA during a period of time in which the coordinated AP transmits an UL trigger to, and receives an UL transmission from, at least one STA associated with the coordinated AP.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "Including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    selecting at least one basic service set (BSS) from one or more neighbor BSSs to form a spatial reuse group (SRG); and
    performing coordinated spatial reuse (CSR) in the SRG with a set of overlapping basic service set (OBSS) power detection (PD) parameters,
    wherein the performing of the CSR comprises:
        transmitting, to a coordinated access point (AP) associated with each of the selected at least one BSS, a list of one or more excluded stations (STAs) which would suffer high interference from downlink (DL) transmissions by a master AP;
        selecting at least one STA not in the list of one or more excluded STAs; and
        performing a DL transmission to the selected at least one STA as part of joint DL spatial reuse (SR) transmissions in conjunction with the coordinated AP associated with each of the selected at least one BSS.

2. The method of claim 1, wherein the selecting of the at least one BSS comprises:
    determining an interference level of each of the one or more neighbor BSSs;
    selecting at least one of the one or more neighbor BSSs having a lowest interference level detected among the one or more neighbor BSSs.

3. The method of claim 2, wherein the determining of the interference level of each of the one or more neighbor BSSs comprises monitoring a power level of one or more signals received from each of the one or more neighbor BSSs.

4. The method of claim 2, wherein the determining of the interference level of each of the one or more neighbor BSSs comprises:
    requesting one or more stations (STAs) associated with a master access point (AP) to report received power levels of a list of one or more coordinated APs; and
    receiving a report from each of the one or more STAs associated with the master AP on the received power levels of the list of one or more coordinated APs responsive to the requesting.

5. The method of claim 4, wherein the report further comprises a transmit (TX) power, receiver sensitivity, a spatial reuse parameter (SRP), or a combination thereof received from the list of one or more coordinated APs.

6. The method of claim 1, further comprising:
    determining the set of OBSS PD parameters that is associated with high path losses higher than a threshold to achieve high spatial reuse (SR) gain within the SRG.

7. A method, comprising:
    selecting at least one basic service set (BSS) from one or more neighbor BSSs to form a spatial reuse group (SRG); and
    performing coordinated spatial reuse (CSR) in the SRG with a set of overlapping basic service set (OBSS) power detection (PD) parameters,
    wherein the performing of the CSR comprises:
        informing a coordinated AP associated with each of the selected at least one BSS of an available bandwidth (BW);
        receiving a request for at least a portion of the available BW from the coordinated AP associated with each of the selected at least one BSS;
        transmitting a grant of some or all of the available bandwidth to the coordinated AP associated with each of the selected at least one BSS; and
        performing joint spatial reuse (SR) transmissions with orthogonal frequency-division multiple access (OFDMA) in conjunction with the coordinated AP associated with each of the selected at least one BSS.

8. The method of claim 7, wherein the selecting of the at least one BSS comprises:
    determining an interference level of each of the one or more neighbor BSSs;

selecting at least one of the one or more neighbor BSSs having a lowest interference level detected among the one or more neighbor BSSs.

9. The method of claim 8, wherein the determining of the interference level of each of the one or more neighbor BSSs comprises monitoring a power level of one or more signals received from each of the one or more neighbor BSSs.

10. The method of claim 8, wherein the determining of the interference level of each of the one or more neighbor BSSs comprises:
  requesting one or more stations (STAs) associated with a master access point (AP) to report received power levels of a list of one or more coordinated APs; and
  receiving a report from each of the one or more STAs associated with the master AP on the received power levels of the list of one or more coordinated APs responsive to the requesting.

11. The method of claim 10, wherein the report further comprises a transmit (TX) power, receiver sensitivity, a spatial reuse parameter (SRP), or a combination thereof received from the list of one or more coordinated APs.

12. The method of claim 7, further comprising:
  determining the set of OBSS PD parameters that is associated with high path losses higher than a threshold to achieve high spatial reuse (SR) gain within the SRG.

* * * * *